US005459631A

United States Patent [19]
Leone et al.

[11] Patent Number: 5,459,631
[45] Date of Patent: Oct. 17, 1995

[54] ELECTRONIC CHARGING MOTOR CONTROLLER

[75] Inventors: David A. Leone, Lawrenceville; William A. King, Lithonia; John L. Culligan, Alpharetta, all of Ga.

[73] Assignee: Siemens Energy & Automation, Inc., Alpharetta, Ga.

[21] Appl. No.: 677,037

[22] Filed: Mar. 28, 1991

[51] Int. Cl.$^6$ .............................. H01H 3/30; H01H 47/32
[52] U.S. Cl. ......................... 361/154; 361/160; 361/170
[58] Field of Search ....................... 361/93, 94, 152–154, 361/187, 205, 170, 160, 114, 115; 307/112; 340/644; 324/418, 424; 335/17, 13, 76

[56] References Cited

U.S. PATENT DOCUMENTS

| | | | |
|---|---|---|---|
| 3,944,772 | 3/1976 | Davies | 335/76 X |
| 4,020,432 | 4/1977 | Erickson et al. | 335/76 |
| 4,042,896 | 8/1977 | Powell et al. | 335/17 |
| 4,562,506 | 12/1985 | Moran | 361/71 |
| 4,597,025 | 6/1986 | Rutchik et al. | 361/94 |
| 4,754,162 | 6/1988 | Kondou et al. | 307/112 |
| 4,812,945 | 3/1989 | D'Onofrio | 361/154 |
| 4,939,437 | 7/1990 | Farag et al. | 318/473 |
| 4,990,873 | 2/1991 | Grunert et al. | 335/14 |

FOREIGN PATENT DOCUMENTS

| | | |
|---|---|---|
| 0149046 | 7/1985 | European Pat. Off. . |
| 0147592 | 7/1985 | European Pat. Off. . |
| 0185238 | 6/1986 | European Pat. Off. . |
| 0330604A3 | 8/1989 | European Pat. Off. . |
| 0331586 | 9/1989 | European Pat. Off. . |
| 0372449 | 6/1990 | European Pat. Off. . |
| 3821987A1 | 4/1990 | Germany . |

OTHER PUBLICATIONS

European Search Report for corresponding Application No. EP 92 25 0073. Dated Feb. 16, 1994.

Primary Examiner—A. D. Pellinen
Assistant Examiner—Fritz M. Fleming

[57] ABSTRACT

Apparatus for closing a circuit breaker of a circuit that carries a substantial current includes a terminals (W1, W2, W12, W13, W14) for connection to an available source of electric power. The electric power available is typically 24 VDC, 48 VDC, 125 VDC or 120 VAC. An actuator including an electric motor M and a solenoid S both designed to operate on 24 VDC first cocks charging springs and then releases the charging springs to close the circuit breaker. A controller including a microprocessor U3 is connected to and derives power from the connected terminals and produces a pulse width modulated control signal (RUN; CLOSE) for controlling the actuator. The duty cycle of the pulse width modulated signal is adjusted in relation to the electric power supplied by the selected source so that the power supplied to the motor and relay functions effectively as the required 24 VDC power. Sensors J1 sense the condition of the charging springs, a charging cam, the circuit breaker, etc., and prevent operation of the circuit breaker closing apparatus unless all conditions necessary to safe operation are satisfied.

16 Claims, 18 Drawing Sheets

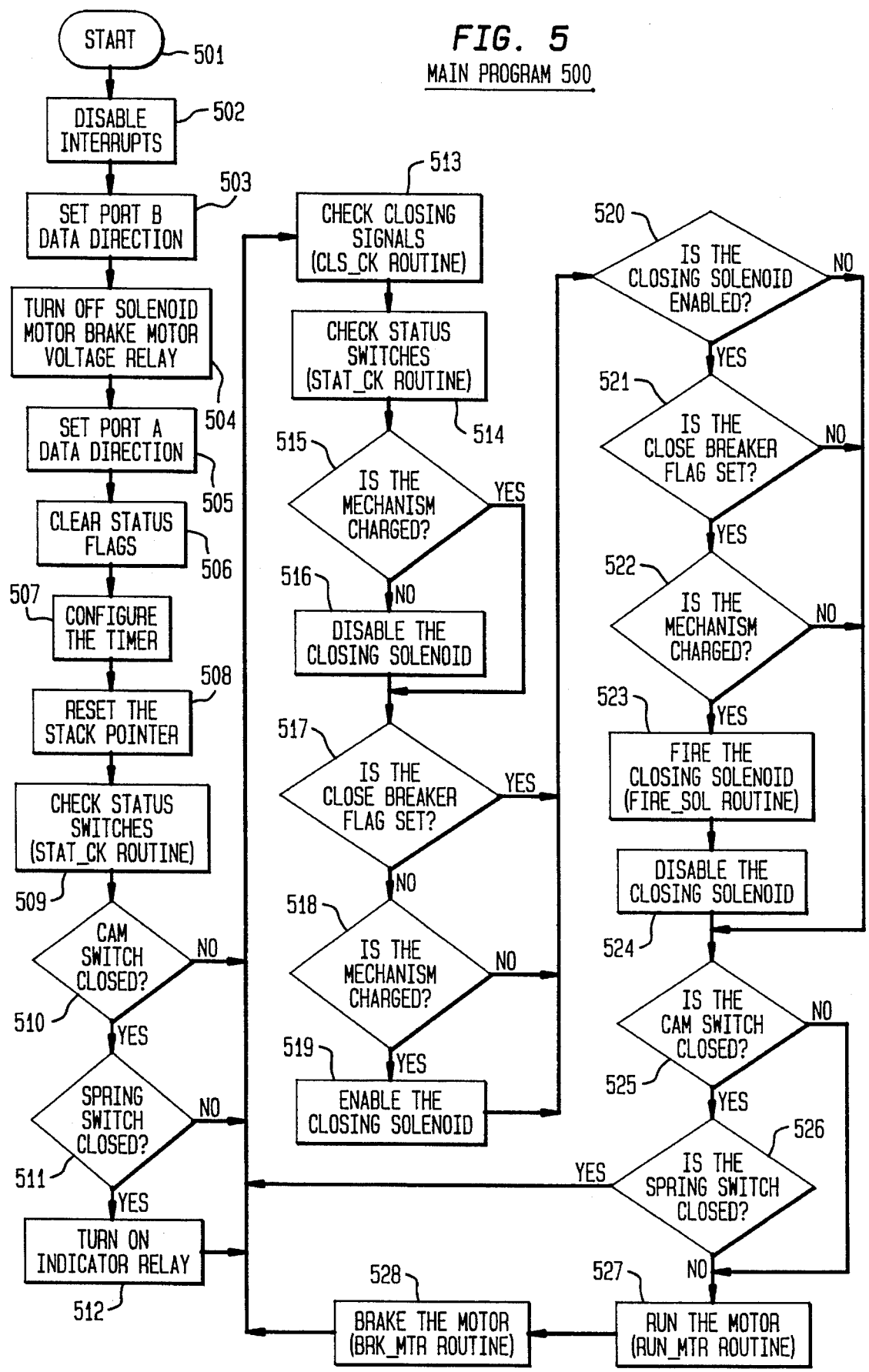

TIMER ISR 600

CHECK CLOSING SIGNALS 700

CHECK STATUS SWITCHES 800

TIME DELAY 900

BRAKE MOTOR 1400

FIRE SOLENOID 1000

READ VOLTAGE 1100

FAILURE 1200

RUN MOTOR 1300

ELECTRONIC CHARGING MOTOR CONTROLLER

BACKGROUND OF THE INVENTION

1. Field of the Invention

This invention relates to apparatus for use in combination with a circuit breaker that is capable of moving from an open position to a closed position and more particularly to novel and highly effective apparatus that can be reliably operated by an AC or DC source of power the voltage of which may have any value within a wide range. The apparatus contains sensors that detect conditions that affect the safe operation of the apparatus, and an electronic control circuit prevents operation of the apparatus unless all conditions necessary to its safe operation are satisfied.

2. Description of the Prior Art

Circuit breakers are very important for the safe operation of many electrical circuits. In case of a short circuit or other condition causing circuit overload, a circuit breaker opens, thus interrupting the current and preventing fire or other serious damage. In circuits that carry relatively low currents at relatively low potential, a circuit breaker when tripped can be closed casually, for example by hand. Generally no arcing, or only minor arcing, will occur as the circuit is closed. In contrast, a circuit breaker for a circuit that carries a large current at a high potential cannot be casually closed after it is opened, because severe arcing will result, which will damage the circuit breaker and the portion of the circuit in its vicinity.

Accordingly, it is conventional in such cases to employ powerful springs to close the circuit breaker with great rapidity so that arcing is held to a minimum. These springs can be cocked or charged by means of a charging motor that is connected to the springs through gearing and a cam. Since the circuit controlled by the circuit breaker has been interrupted, the power for the charging motor and a release solenoid that is fired to release the cocked springs must be separately available. A hand-operated jack or pump is usually provided as a back-up to the charging motor. When the springs are fully charged, they are held in the cocked position by a sear that is operated by the release solenoid. When the solenoid is fired, the sear is withdrawn, and the cocked springs are released to close the circuit breaker with great rapidity. Such apparatus for closing a circuit breaker is typically employed in electric power distribution networks at power inputs to factories and other large users of power.

In the prior art, the system for operating the charging motor and the firing solenoid operates from a power supply having predetermined characteristics. For example, the power supply may be 120 VAC, 24 VDC, 48 VDC or 125 VDC. Depending on the power supply available, different internal wiring for the electrical portion of the circuit breaker closing apparatus must be employed. This requires a semi-custom installation, which is relatively expensive.

Moreover, while some interlock features are conventional, there are some unsafe conditions that cannot be detected by conventional apparatus, with the result, for example, that under certain circumstances the charging motor employed to charge the closing springs may continue to run under a condition such that the motor should be stopped. In such a case, damage to the equipment may result.

OBJECTS AND SUMMARY OF THE INVENTION

An object of the invention is to remedy the problems of the prior art noted above. In particular, an object of the invention is to provide apparatus for use in closing a circuit breaker, the apparatus being constructed so that it can be used with power supplies having different characteristics without expensive and cumbersome rewiring. Another object of the invention is to provide such apparatus with safety features such that the apparatus cannot be operated unless all conditions necessary to its safe operation are satisfied.

The foregoing and other objects are attained in accordance with the invention by providing apparatus for use in combination with a circuit breaker that is capable of moving from an open position to a closed position, the apparatus comprising: terminal means for connection to a selected source of electric power, the electric power available from the source having a characteristic that varies parametrically in accordance with the source selected; actuating means for moving the circuit breaker from the open position to the closed position, the actuating means being connected to and deriving power from the terminal means and including at least one electric component requiring for its proper operation electric power of a predetermined characteristic; and control means connected to and deriving power from the terminal means and producing a control signal for controlling the actuating means, the control signal having an adjustable characteristic related to the parametrically variable characteristic in such a manner that the power supplied to the electric component effectively conforms to the predetermined characteristic.

In accordance with an independent aspect of the invention, apparatus is supplied for use in combination with a circuit breaker that is capable of moving from an open position to a closed position, the apparatus comprising: sensing means for sensing at least one condition that must be satisfied in order for the circuit breaker to be moved safely from the open position to the closed position; actuating means for moving the circuit breaker from the open position to the closed position; and electronic control means responsive to the sensing means and controlling the actuating means in such a manner that the actuating means moves the circuit breaker from the open position to the closed position only when the condition is satisfied.

Apparatus constructed in accordance with the invention preferably embodies both of the independent aspects of the invention summarized above.

Other objects, features and advantages of the invention will become apparent from a consideration of the following detailed description of the preferred embodiment thereof, in conjunction with the appended figures of the drawing.

BRIEF DESCRIPTION OF THE DRAWING

FIG. 1 shows a regulated DC power supply for operation of various circuit components. FIG. 2 shows terminals for connection to different external sources of electrical power. FIG. 3 shows means for sensing various conditions that must be satisfied for safe operation of the circuit breaker closing apparatus and a microprocessor. FIG. 4 shows means for processing three of four outputs and circuit breaker actuating means.

FIGS. 5–14 constitute a flow chart for operation of the circuitry of FIGS. 1–4, FIG. 5 being a main program, and FIGS. 6–14 being subroutines called up in each case by the main program or another subroutine. FIG. 6 shows a timer interrupt service subroutine. FIG. 7 shows a check-closing signals subroutine. FIG. 8 shows a check status switches subroutine. FIG. 9 shows a time-delay subroutine. FIG. 10 shows a fire-solenoid subroutine. FIG. 11 shows a read voltage subroutine. FIG. 12 shows a failure subroutine. FIG. 13 shows a run motor subroutine. FIG. 14 shows a brake motor subroutine.

FIGS. 15–17 are views in elevation of the circuit breaker closing apparatus, wherein FIG. 15 shows spring means in a charged condition and a tripping latch engaged, FIG. 16 shows a cam in a dwell position and FIG. 17 shows a standby charging handle in a stored position.

DESCRIPTION OF THE PREFERRED EMBODIMENTS

Overview of Circuit

FIGS. 1–4 assembled as described above show a preferred embodiment of an electrical circuit constructed in accordance with the invention.

Figure 2:
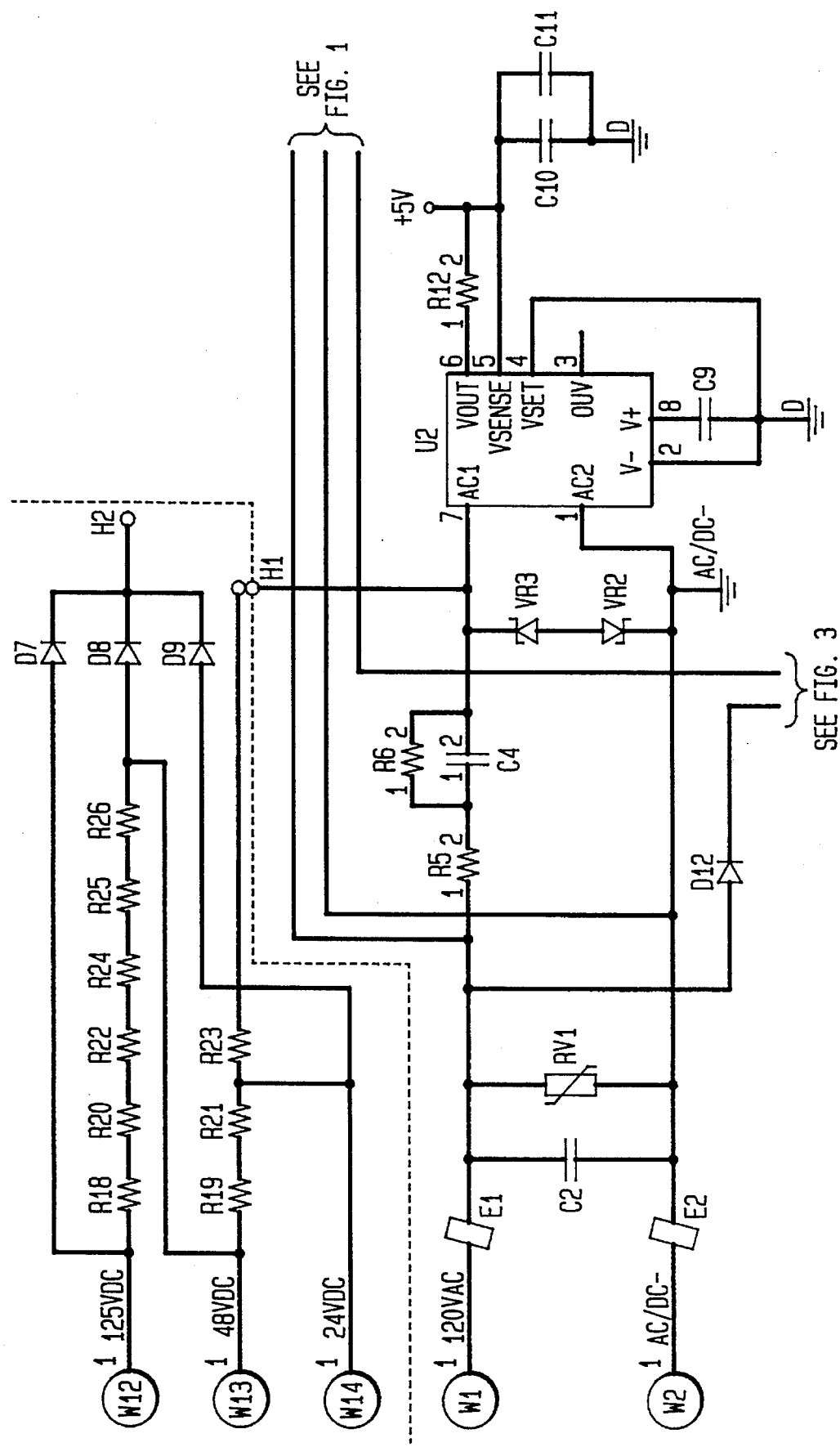

FIG. 2 shows circuitry responsive to whatever external power supply is available for generating well-regulated 5-volt and for operation of various circuit components. The 5-volt power source is applied at four places in FIG. 3 and at one place in FIG. 4. The 12-volt power supply is applied at two places in FIG. 4.

Figure 1:
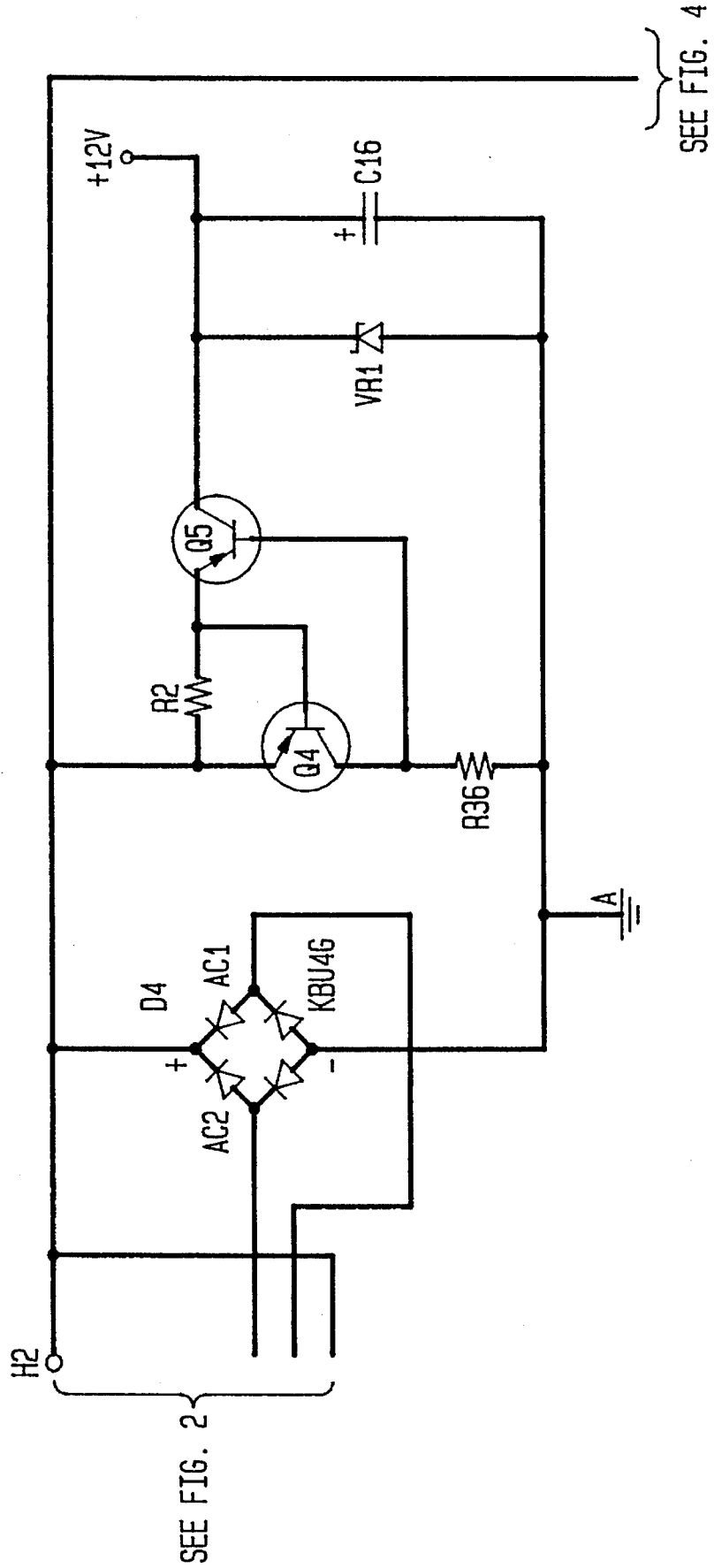
FIGS. 1–4, when assembled with FIG. 1 oriented horizontally and positioned in a northeast position, FIG. 2 oriented horizontally and positioned in a northwest position, FIG. 3 oriented vertically and positioned in a southwest position, and FIG. 4 oriented vertically and positioned in a southeast position, constitute a schematic circuit diagram of apparatus constructed in accordance with the invention, wherein, as indicated in the drawing, there are four lines or connections between FIGS. 1 and 2, two between FIGS. 2 and 3, four between FIG. 3 and 4, and one between FIGS. 1 and 4.

FIG. 2 shows terminals for connection to different external sources of electric power (depending on availability), including 120 VAC, 24 VDC, 48 VDC and 125 VDC. FIG. 1 shows circuitry for generating 12-volt DC power for operation of various circuit components. The 12-volt power supply is applied at two places in FIG. 4.

Figure 3A:
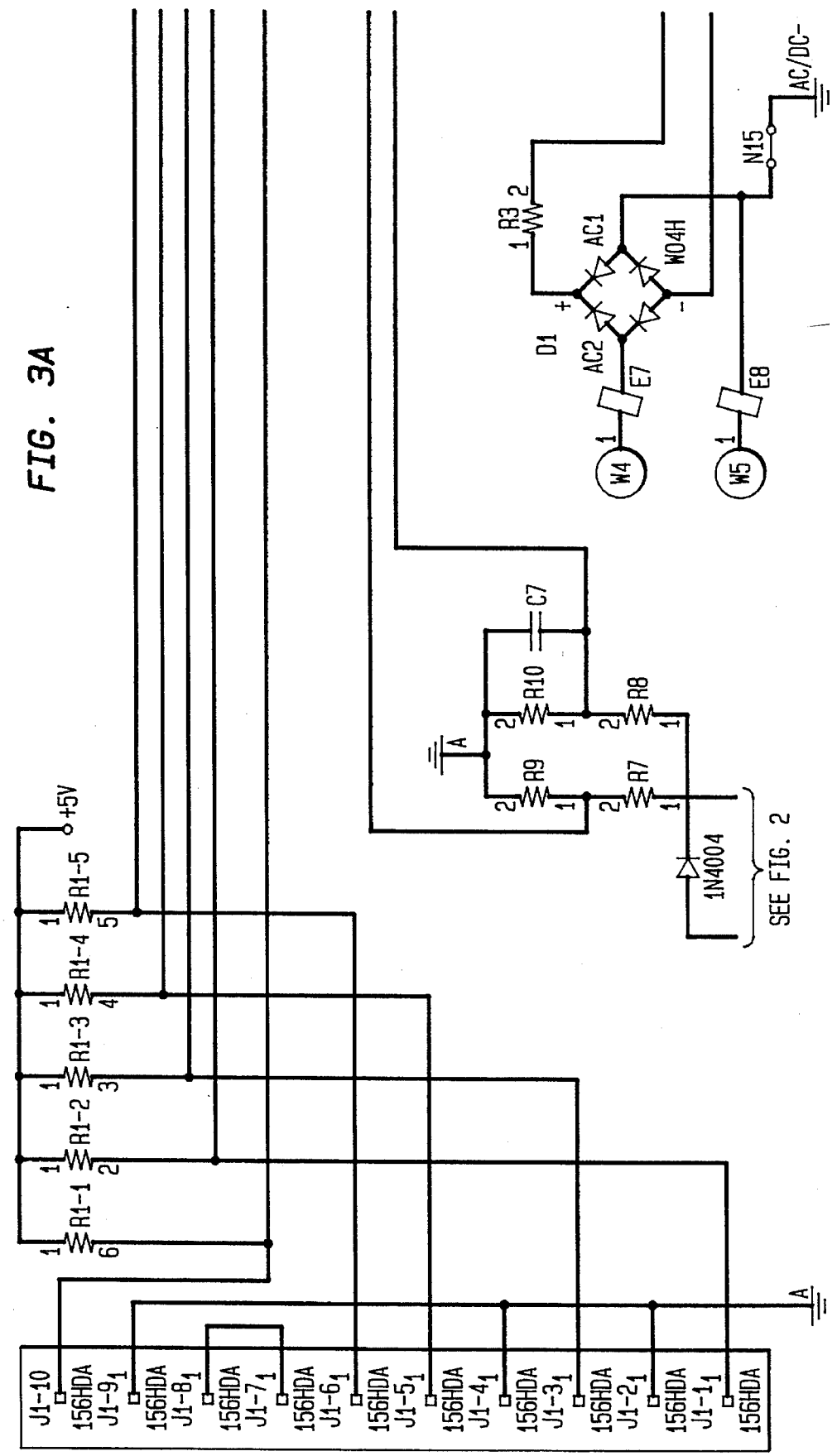
Figure 3B:
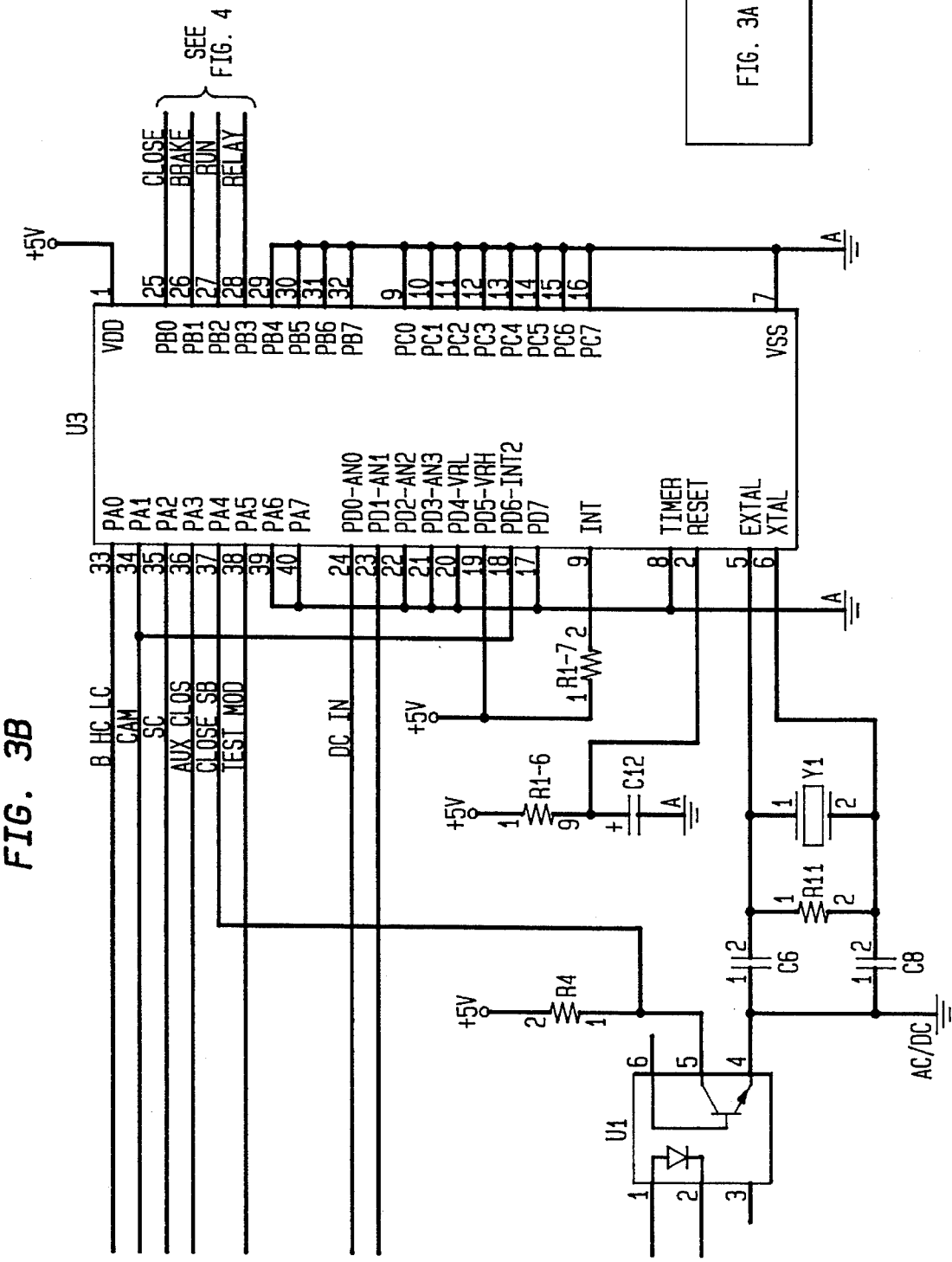

FIG. 3 shows means for sensing various conditions that must be satisfied for safe operation of the circuit breaker closing apparatus and a microprocessor that responds to these conditions and to other signals for generating four output signals respectively called "CLOSE," "BRAKE," "RUN," and "RELAY".

Figure 4A:
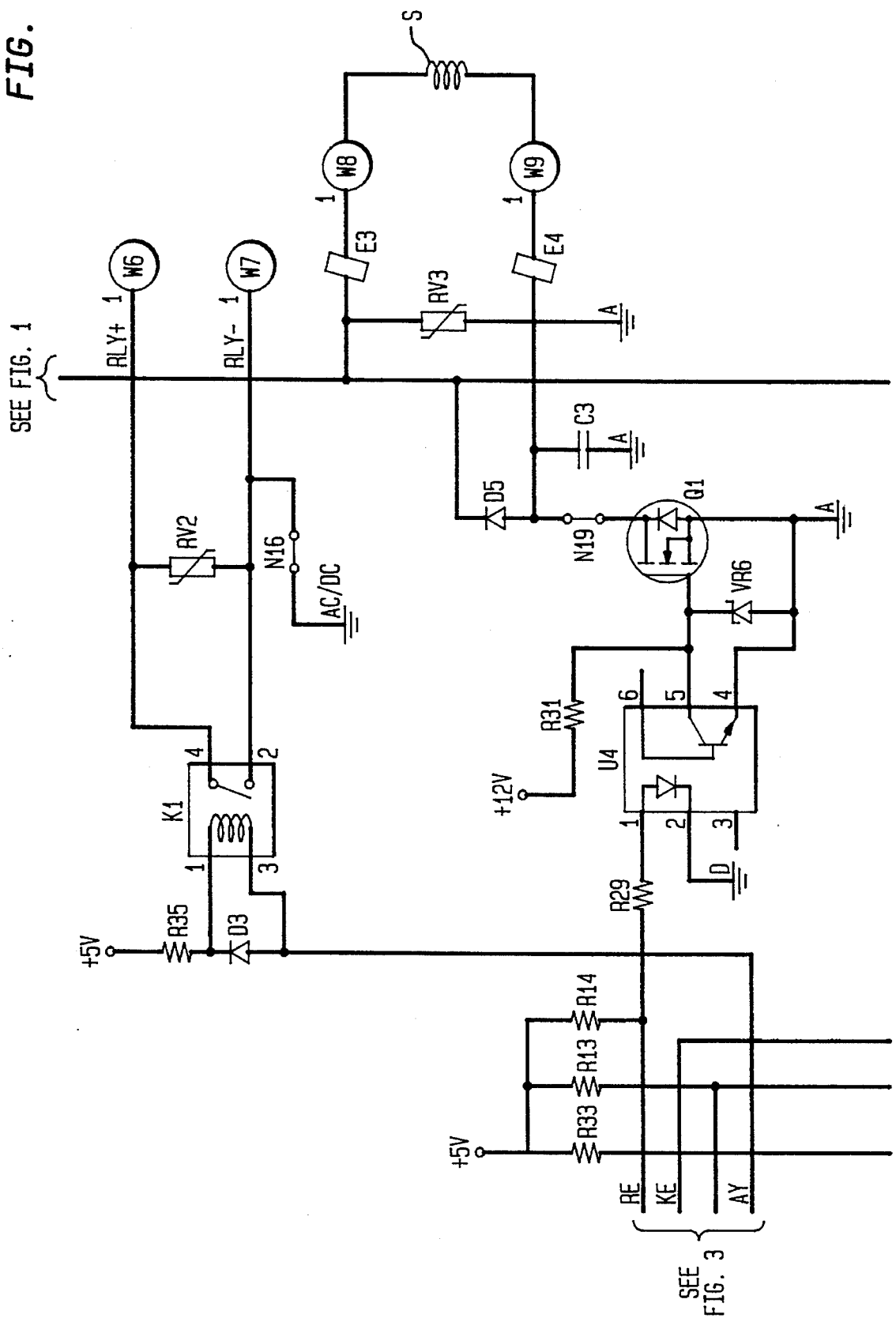
Figure 4B:
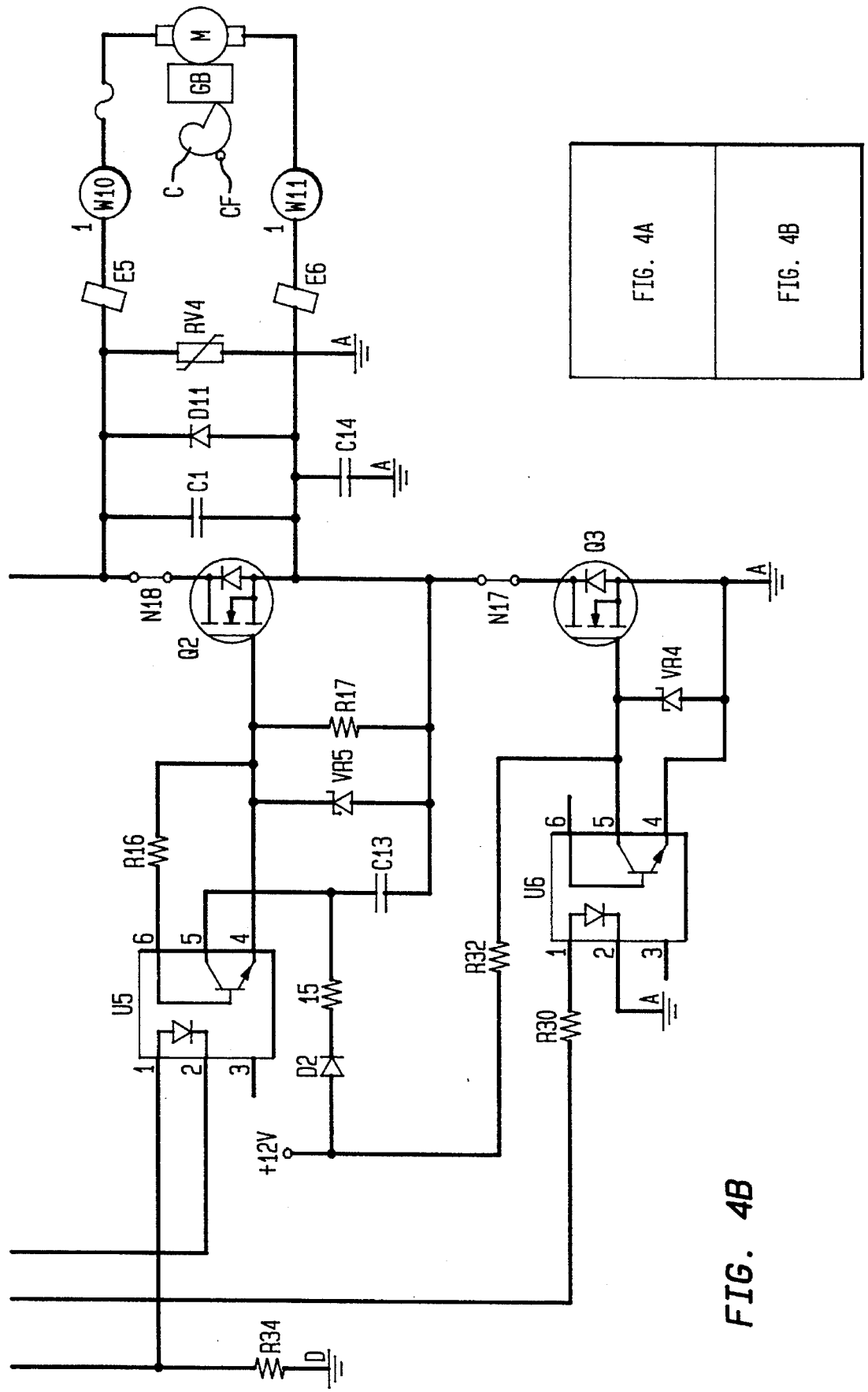

FIG. 4 shows means for processing three of the four outputs. FIG. 4 also shows actuating means for moving the circuit breaker from an open position to a closed position. The actuating means includes a charging motor M that cocks the springs employed to close the circuit breaker and a release solenoid S that releases the springs. The charging motor M operates through a gearbox GB, a cam C, and a cam follower CF.

The electronic charging motor controller U3 is capable of controlling the supply of power to the 24 VDC motor M used to charge the breaker's closing springs. It also provides power to operate the close solenoid S.

The power of the controller U3 is:

24 VDC, 2.5A maximum current to power the motor M.

24 VDC, 18A maximum current to power the closing solenoid S.

The 50% duty cycle of the motor is 10 seconds on, 10 seconds off.

The controller U3 accepts switch inputs to determine when to supply power to the motor M or remote close solenoid S.

The controller U3 has a fuse installed in the circuit in series with the motor to protect the motor windings. Switch inputs required to cause the controller U3 to power to the motor M are:

| Switch | Indication |
| --- | --- |
| Spring check (SC) | Springs charged |
| Cam check switch (CAM) | Cam in dwell position |

If either switch is open, power is supplied to the motor M. If both switches are closed, power to the motor M is stopped. At the end of a charging cycle, when both switches close, the motor M is dynamically braked. Braking prevents coasting beyond the dwell portion of the cam. This is accomplished by shorting the motor terminals.

Figure 15:
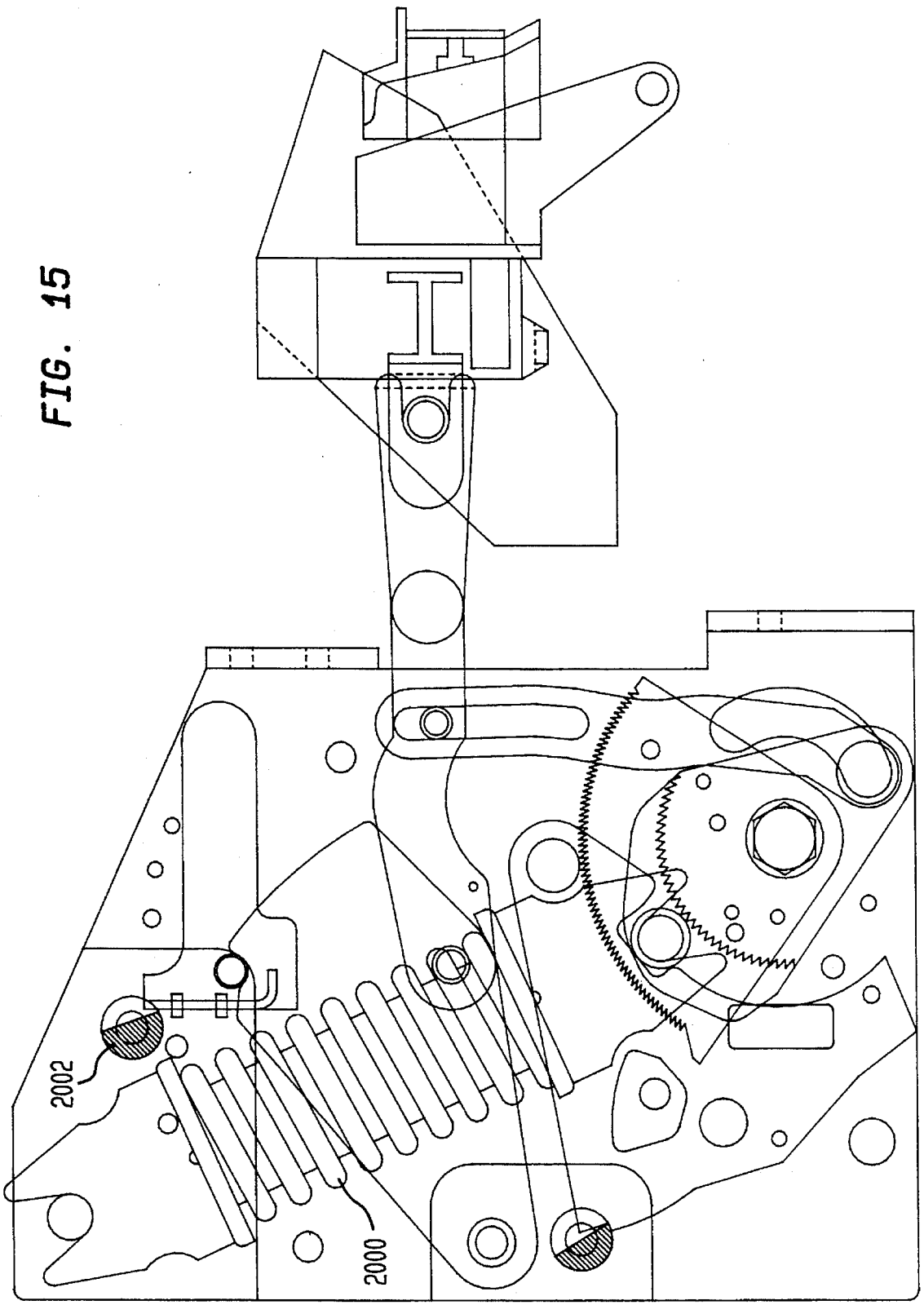
Figure 16:
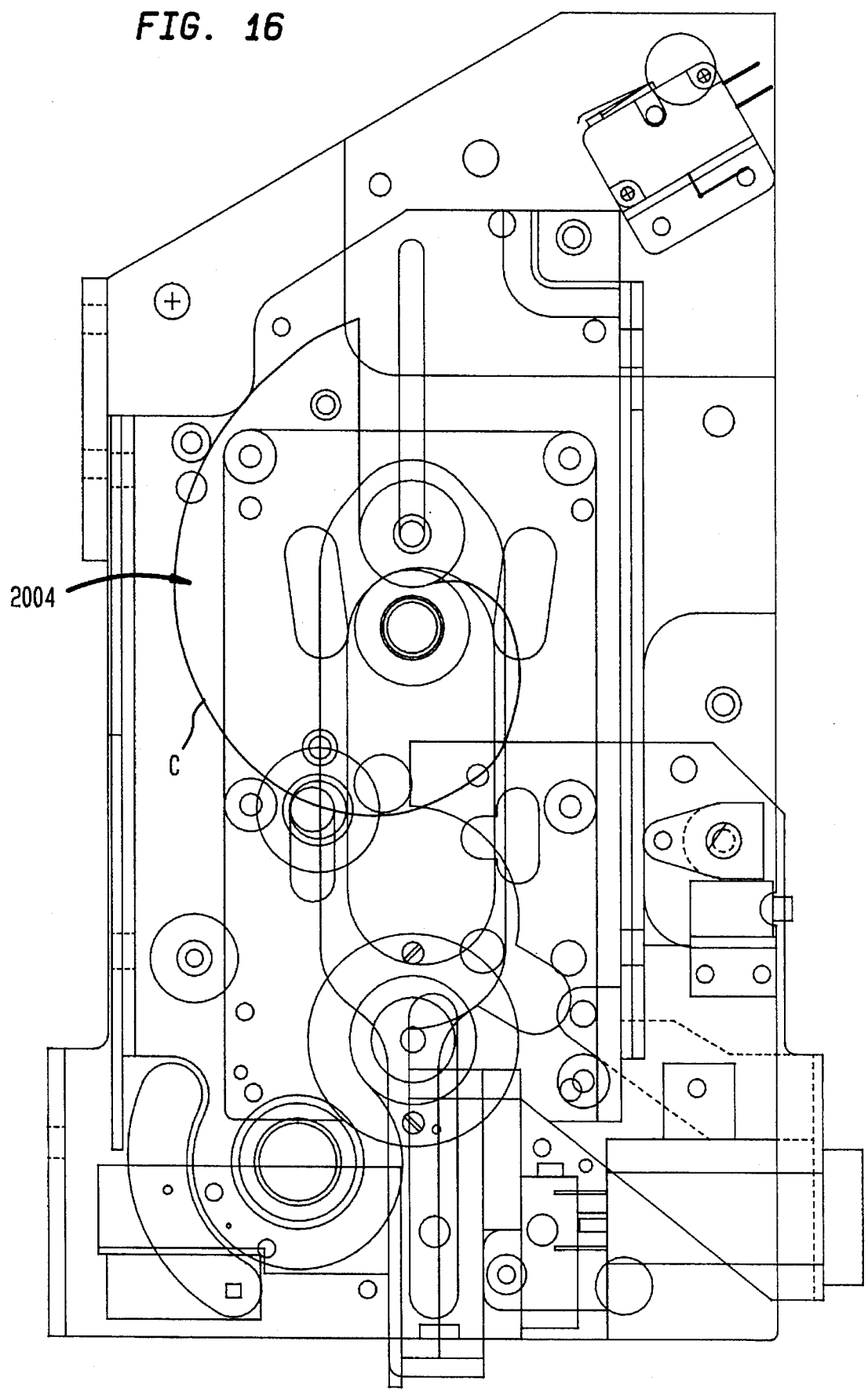
Figure 17:
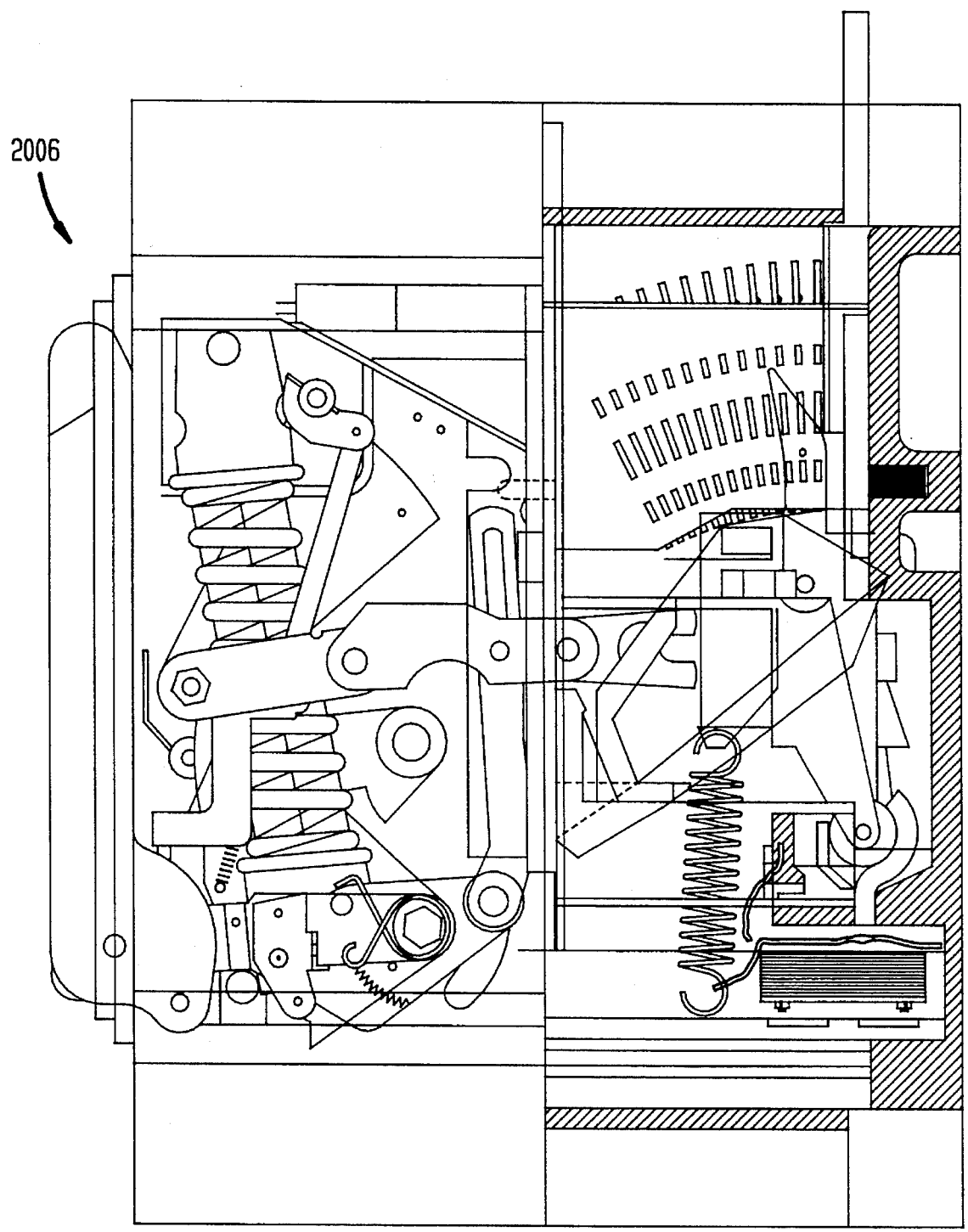

FIGS. 15–17 are views in elevation of the circuit breaker closing apparatus, wherein FIG. 15 shows spring means 2000 in a charged condition and a tripping latch 2002 engaged, FIG. 16 shows a cam 2004 in a dwell position and FIG. 17 shows a standby charging handle 2006 in a stored position.

The controller U3 accepts inputs to determine when to supply power to the remote close solenoid S. It applies power for only a 100 ms period or until the "B" contact opens. Inputs required to cause the controller U3 to power the closing solenoid S are:

| | Switch | Indication |
| --- | --- | --- |
| mech. status switches | Spring check (SC) | Springs charged |
| | Cam check (CAM) | Cam in dwell position |
| | Handle check (HC) | Charge handle stowed |
| | Latch check (LC) | Tripping latch engaged |
| | "B" switch (B) | Breaker open |
| | Remote close (REM) (external to breaker) | Remote closing signal supplied |
| user switches | Local elec. close (LOC) | Local closing signal supplied |

The controller U3 also accepts a remote close signal from the "ACCESS" communication system.

All mechanism status switches must be closed for the controller U3 to accept a closing signal. If all mechanism status switches are closed and a closing signal is supplied, then the controller U3 supplies power to the closing solenoid S. If a closing signal is supplied before all of the mechanism status switches are closed and maintained until all status switches close, the controller U3 will not power the solenoid S. If any of the status switches are open, the controller U3 will not supply power.

The controller U3 supplies power to the solenoid S only one time with each application of a remote close signal. If either the remote close switch or the local electric close switch is held closed, the controller U3 does not re-apply power until the switch is opened and re-closed.

The electronic motor controller U3 has the connections for the above listed switches physically located close to the respective switches.

Provision is preferably made for remote indication of the following status indicators via the "ACCESS" system:

Breaker charged

Breaker closed

Breaker did not charge properly

Breaker did not close properly
Low supply voltage

The apparatus supplies power to the motor M of FIG. 4 used to charge or cock the closing springs for the circuit breaker. It also provides power to operate the closing solenoid S. Both the motor M and the closing solenoid S are designed to operate on power of a predetermined characteristic, such as 24 VDC power. The apparatus accepts switch inputs (FIG. 3) to determine breaker status and the proper time to supply power to the motor M or to the closing solenoid S. It also provides dynamic braking for the motor by providing a low impedance path across the motor terminals for 100 milliseconds. This maintains proper breaker cam position. It provides power to the closing solenoid only during proper breaker status and only once per each actuation of a remote close or local close switch. It operates with input voltages of 120 VAC, 24 VDC, 48 VDC or 125 VDC.

The apparatus eliminates conventional electro-mechanical relays that supply power and dynamic braking to the spring charging motor. These relays have been shown to be unreliable in an internal breaker environment because of high shock levels and other factors. The apparatus of the invention eliminates large power transformers and heat generating resistors that are required conventionally to allow the 24 VDC spring charging motor to operate with inputs of not only 24 VDC but also 48 VDC, 125 VDC, and 120 VAC. If a step-down transformer is employed, higher AC voltages including 220 VAC or 240 VAC can be accommodated.

Conventionally, the spring charging motor control, closing solenoid actuation, and breaker status determination are effected by circuitry including electromechanical relays, power transformers, power dissipating resistors and custom hard-wiring. Electromechanical relays are conventionally used both for motor control and logic functions for determining breaker status. Motor power is provided by various combinations of power resistors and power transformers. This conventional system is labor intensive when assembling the breaker to meet control voltage specifications. This leads to a less standardized product. Excessive heat is generated inside the breaker for the higher control voltages, and the electromechanical relays are relatively unreliable.

The present invention provides voltage feedback to the spring charging motor M. This in turn allows a constant spring charging time. It also allows the spring charging motor to operate properly during low voltage conditions. This is a common occurrence since batteries are often used on site to supply power for operating the charging motor and release solenoid. The present invention incorporates a microprocessor based on solid state technology. This lends itself to higher reliability and greater flexibility.

In accordance with the invention, a pulse width modulating control circuit is employed to provide power to the spring charging motor M. This feature allows operation of a 24 VDC motor using 24 VDC, 48 VDC, 125 VDC or 120 VAC without the use of heat generating power resistors or transformers. It also avoids the need to provide more than one type of charging motor along with the need to provide more than one type of wiring scheme for various control voltages that may be available at different locations. This results in a more standard product by allowing assemblers merely to connect the internal wiring harness to the associated control voltage input terminals of the apparatus. In conventional practice, the breaker is wired differently and contains different power components at different sites where different power supplies are employed.

In accordance with the present invention, the microprocessor monitors the status of the breaker and detects malfunctions in the operation of the charging motor by monitoring the spring charging time and supplied voltage. Breaker status can be transmitted over communication lines and failure modes can be indicated on a remote indicator panel.

The present invention avoids the need to supply more than one type of closing solenoid. A pulse of modulated width associated with each available supply voltage is supplied to a 24 VDC solenoid to initiate the breaker closing. This allows for better protection of the closing solenoid and reduces the number of steps during assembly.

The invention uses reliable solid state technology to drive and brake the spring charging motor and to provide power to the closing solenoid. Power field effect transistors (FETs) are used in place of the previously used electromechanical relays. The present invention eliminates the AP switch and the AP relay employed conventionally.

Detailed Circuit Description

In FIG. 1, the regulated 12 VDC is provided by the linear regulator circuit of Q4, Q5, VR1, C16, R2, R36 and full wave rectifier D4. The circuit accepts its inputs through the same terminals as U2, but the 120 VAC input is connected directly to the regulator circuit and the 24 VDC, 48 VDC or 125 VDC input is provided by an "OR" function via diode D7, D8 or D9 of FIG. 2. Jumpers H1 and H2 select between an AC or DC configuration.

FIG. 3 shows a header J1 employed to monitor conditions that must be satisfied if the breaker closing apparatus is to be operated safely. In the header J1, the terminals $9_1$, $8_1$, $7_1$, $4_1$ and $2_1$ are used to ground switches. The terminals 10 (TEST MOD), $6_1$ (B-HC-LC), $5_1$ (CAM), $3_1$ (SC) and $1_1$ (AUX CLOS) are active. The terminal 10 is connected to a resistor R1-1 and to an input port PA5 of a microprocessor U3. The terminal $6_1$ is connected to a resistor R1-5 and to an input port PA0 of the microprocessor U3. The terminal $5_1$ is connected to a resistor R1-4 and to an input port PA1 of the microprocessor U3. The terminal $3_1$ is connected to a resistor R1-3 and to an input port PA2 of the microprocessor U3. The terminal $1_1$ is connected to a resistor R1-2 and to an input port PA3 of microprocessor U3. The other ends of the resistors are connected to +5V. Representative values of the resistors mentioned and of other resistors and other components are indicated in the drawing. The micro-switches connected to the header J1 provide the apparatus with position information relating to the mechanical components which the apparatus uses to provide control to the spring charging motor M and closing solenoid S. The switch status is read by the microprocessor U3 via the input ports PA0, PA1, PA2, PA3 and PA5.

An input to port PA4 (CLOSE-SB) is provided by remote close switch across terminals W4, W5, as described below.

If any of the circuits sampled by the header J1 and by the remote close terminals W4, W5 is open, the 5-volt power supply applied to the resistor R1 and to an optocoupler U1 described below maintains a high potential at the corresponding one of input ports PA0 through PA5, thereby signalling the microprocessor U3 of the presence of a condition that must prevent operation of the breaker closing apparatus. If all of these monitored switches are closed, the potentials at the corresponding input ports drop substantially to 0, indicating that the solenoid S is ready for firing.

The remote control switch at W4, W5 is normally provided by a user of the apparatus. A full-wave rectifier D1 is connected to the terminals W4 and W5. The full-wave rectifier consists of four diodes arranged as a Wheatstone bridge for full-wave rectification. An optocoupler U1 is connected to the plus and minus terminals of the bridge. The optocoupler U1 consists of a light emitting diode (LED) and a phototransistor. Its function is to provide isolation and to provide a generic input circuit to accept any of the control inputs of 24 VDC, 48 VDC, 125 VDC or 120 VAC available at W4, W5.

The input terminals W1, W2, W12, W13 and W14 (FIG. 2) can be connected to any of various power supply sources available at the site. A step-down voltage regulator U2 provides a +5 VDC regulated output.

The regulator circuits described above demonstrate the flexibility of the apparatus of the invention. The only differences in wiring the breaker for the different power supplies are the terminal connections or jumper configurations.

Voltage feedback from any of the inputs available on site is provided by a circuit including a diode D12, a resistor RS, a resistor R10, a capacitor C7, a resistor R9, and a resistor R7. This circuit selects the proper voltage level to be supplied to an analog to digital converter included in the microprocessor U3 and supplied via input port AN0 in case of a DC power input and via input port AN1 in case of an AC power input. The duty cycle of various output signals supplied by the microprocessor U3 is adjusted accordingly.

More particularly, the diode D12 performs half-wave rectification on power supplied by terminals W1 and W2. The half-wave rectified signal is supplied to the resistor R8. The resistor R8 is in series with the resistor R10 and the capacitor C7, the latter two of which are in parallel with each other. A ground is connected between the remote ends of the resistor R7 and capacitor C7 and the resistor R9. The half-wave rectified AC signal is therefore applied to the input port AN1 of the microprocessor U3.

If a DC voltage is applied via the terminal W2 and any of the terminals W12, W13, and W14, the DC voltage is supplied via the terminal H2 in FIG. 2 and a voltage divider network including the resistors R7 and R9 in series with each other. The voltage is picked off between the resistors R7 and R9 and supplied to the input terminal AN0 of the microprocessor U3. Since the resistance of the resistor R7 greatly exceeds that of the resistor R9, and since the remote end of the resistor R9 is connected to ground, the voltage supplied to the terminal AN0 is reduced to a level that can be accommodated safely by the microprocessor U3.

When the microprocessor U3 detects that monitored switches are all in the correct position for operation of the spring-charging motor M (FIG. 4), power is supplied to the motor M. A pulse-width modulated or PWM signal is generated by the microprocessor U3 via an output port PB2 and is used to activate the LED of an optocoupler U6. The optocoupler U6 also comprises a phototransistor that becomes conductive in response to activation of the LED. The optocoupler U6 provides isolation and along with a resistor R32, which is connected to +12V, provides bias for a motor-drive field-effect transistor or FET Q3. The high-side voltage for the spring-charging 24 VDC motor M is supplied to the terminal W10 from whichever of the terminals W1, W12, W13, W14 is connected to the external source of power. DC power is supplied via the terminal H2 and AC power is supplied via the diode rectifier D4, by which it is full-wave rectified. The same external power supply is employed to generate well regulated +5V and +12V power for use in the circuitry as disclosed herein. Thus if terminal W14 of FIG. 2 is active, the motor M receives the power for which it was designed. In all other cases, it does not. The present invention solves this problem among others. In particular, the width of the PWM signal is adjusted in accordance with the voltage of the power supplied.

When the output port PB2 of the microprocessor U3 is low, the gate of the FET Q3 is high, because the LED of the optocoupler U6 is turned off, the phototransistor of the optocoupler is also turned off, the Zener diode VR4 blocks current flow to ground, and there is thus no current flow in the line from the +12V source to the gate of the FET Q3. The FET Q3 is therefore biased "on" in the saturated region and acts as a switch to allow current to flow through the motor M from the motor terminal W10 to the motor terminal W11 to the FET Q3 and back to the source through ground. The FET Q3 is switched on and off at a rate determined by the voltage feedback circuit described above. Specifically, the voltage level supplied to the terminal AN0 (in the case of DCV) or AN1 (in the case of ACV) is sampled, converted to digital form by the digital to analog converter incorporated in the microprocessor U3, and employed to determine the width of the pulse-width modulated signal supplied at the output port PB2 which through the optocoupler U6 controls the gate of the FET Q3.

When the motor M is switched off, the field produced by the windings of the motor causes the motor current to circulate through the diode D11 and the motor windings. This causes the motor to regenerate current and coast until the next "on" cycle of Q3. This configuration is thus a true PWM drive circuit configuration. Capacitors C1 and C14 and a metal oxide varistor RV4 provide transient protection against large voltages which are produced during the reverse recovery time of a diode D11. This function was previously accomplished with electromechanical relays.

When both the CAM and the springcharging (SC) microswitches of the breaker are closed subsequent to being open, the motor M must be braked to keep the charging cam driven by the motor M from coasting. Under these conditions the PWM circuit is turned off, and the initiating signal BRAKE to brake the motor is generated by the microprocessor at its output port PB1. The braking is accomplished by providing a low impedance path across the terminals W10 and W11 of motor M to collapse the field across the motor M and stop the circulating current through the motor M and the diode D11. The low impedance is provided by a field-effect transistor or FET Q2. The FET Q2 is on the high side of the drive circuitry for Q3. That is, the FET Q2 is connected on the side of the FET Q3 that is away from the ground connection and toward the voltage supply. The high side drive to the FET Q2 is provided by the charge pump circuitry consisting of an optocoupler U5, the diode D2, resistors R15 and R16, and a Zener diode VR5. This circuit provides a 12-volt bias source to the FET Q2, with reference to motor terminal W11, whenever the output port PB1 of the microprocessor U3 is high. The resulting brake signal is applied for approximately 100 milliseconds.

If a light or other indicator (not shown) is connected to terminals W6 and W7 (FIG. 1), a relay K1 provides an indication to the user of the apparatus of the springcharging status of the motor M. The relay K1 is driven from output port B3 of the microprocessor U3. The contacts of the relay K1 open and close at a rate of once every second while the motor is running, i.e., while the springs are being charged. The relay contacts remain closed and the light or other indicator remains actuated when the springs are in a fully charged state.

When the micro-switches representing B-HC-LC, CAM and SC are closed and a remote-close signal is applied via the remote-close terminals W4 and W5, or the local closed button on the breaker is depressed, this causes the input port PA3 of the microprocessor U3 to switch from five volts to zero volts and initiates a low signal from the port PB0 of the microprocessor U3. This signal enables the biasing circuitry for the FET Q1, consisting of the optocoupler U4 and the resistors R29, R31 and R14, to supply bias voltage to the gate of the field-effect transistor or FET Q1. This energizes the closing solenoid connected across the terminals W8 and W9. The time period of the applied signal to the solenoid is a function of the voltage feedback acquired by the analog to digital convertor incorporated in the microprocessor U3. This period provides a proper closing current to a 24 VDC solenoid for all of the various control voltages. The closing solenoid initiates the closing of the circuit breaker by releasing the cocked springs. Heretofore, this function has been accomplished by means of electromechanical relays.

The functions of the remaining circuit components will be clear to those skilled in the art. In FIG. 2, dissipating resistors R18 through R26 provide the correct input DC voltage for the coupler U2. Resistors R5 and R6 and capacitor C4 provide the proper input AC voltage for the coupler U2. Elements VR2 and VR3 drop the input voltage to 12V, and elements C2 and RV1 provide surge protection. The resistor R12 limits the output current of coupler U2, and capacitors C9, C10 and C11 smooth the output. In FIG. 3, resistor R3 drops the input voltage to the coupler U1. Resistor R1-6 and capacitor C12 maintain the microprocessor U3 in a reset state until the power supply becomes stable. Input ports to the microprocessor U3 which are not needed are connected to ground. An oscillator is formed by crystal Y-1, resistor R11, and capacitors C6 and C8. In FIG. 4, the resistors R33 and R34 are current setting resistors for the coupler U5, and the resistors R13 and R30 are current setting resistors for the coupler U6. Surge suppression is supplied by RV2, RV3 and C3, and flyback diodes D3 and D5 respectively protect the coils K1 and S against voltage spikes when the coils are turned off. The ferrite beads E1 and E2 (FIG. 2), E7 and E8 (FIG. 3), and E3–E6 (FIG. 4) effect rejection of high frequency noise generated by the motor M (FIG. 4).

The Flow Charts

The flow charts 500 through 1400 shown in FIGS. 5 through 14 are entitled, respectively, "main program," "timer ISR," "check closing signals," "check status switches," "time delay," "fire solenoid," "read voltage," "failure," "run motor," "brake motor." The main program 500 calls up, as appropriate, the subroutines status check, check closing, fire solenoid, run motor, and brake motor. The failure subroutine Calls up, as appropriate, the delay subroutine, and the run motor subroutine calls up, as appropriate, the delay subroutine, the read voltage subroutine (in two places), and the status check routine. The brake motor routine calls up, as appropriate, the delay routine.

FIG. 5 shows the main program 500, its beginning being shown at 501. This program, with the subroutines shown in FIGS. 6–14, controls the operation of the microprocessor U3 shown in FIG. 3. The microprocessor U3 is a Motorola 68705R3, and the port directions are determinable by the software. At step 502, as part of an initialization procedure, all internal and external interrupts are disabled. At step 503, the ports PB0 through PB3 of the microprocessor U3 are set to be output ports. The ports PB4 through PB7, PC0 through PC7, and VSS are connected to ground and are not used. At Step 504, the solenoid S, the brake and drive voltage for the motor M, and the voltage for the relay K1 are all turned off. At step 505, the directions of the ports PA0 through PA5, are set to be input ports. At step 506, all status flags are cleared from memory locations. At step 507, the timer is configured by setting the clock rate to increment every four microseconds. At step 508, the stack pointer is reset to keep track of the program location and to return to the correct location after a jump to a subroutine. At step 509, the various status switches are checked, employing the status check subroutine of FIG. 8 (described below).

At steps 510 and 511, it is determined whether the CAM switch is closed and whether the spring switch is closed. The CAM switch reflects the status of the cam driven by the motor M through a gearbox GB, and the spring switch reflects the status of the charging springs. If both tests are passed, it means that the springs are properly cocked and at step 512 the indicator relay K1 is turned on. If either of the tests at 510 and 511 is failed, or otherwise after turning on the indicator relay K1, the closing signals are checked at step 513 using the closing check subroutine of FIG. 7 (described below). Then at step 514, the status of the switches is checked again using the status check routine of FIG. 8.

At step 515, it is determined whether the mechanism is charged by looking at a mechanism-charged flag. This flag is set at step 819 of the check status switches subroutine of FIG. 8. If the test is passed, the program proceeds immediately to step 517. If the test at step 515 is not passed, the closing solenoid S is first disabled.

At step 517, it is determined whether the close breaker flag is set. This flag is set during the check closing signals routine of FIG. 7 described below. If the test at step 517 is passed, the program proceeds to step 520. If the test at step 517 is not passed, the program proceeds to step 518, where it is determined whether the mechanism is charged. If not, the program proceeds to step 520. If at step 518 the mechanism is determined to be charged, the closing solenoid S is enabled at step 519.

At step 520, it is determined again whether the closing solenoid S is enabled. This is done by looking for the appropriate flag. If it is not enabled, the program proceeds to step 525. If it is determined at step 520 that the closing solenoid S is enabled, the program proceeds to step 521, where it is determined whether the close breaker flag is set. If not, the program proceeds to step 525. If at step 521 the close breaker flag is determined to be set, the program proceeds to step 522, where it is determined by looking for the appropriate flag whether the mechanism is charged. A charged mechanism implies that the springs are compressed, the handle used as a standby spring-charging means is properly stored, etc. If the mechanism is found to be charged at step 522, then at step 523 the closing solenoid S is fired. This is done by calling up the fire solenoid subroutine illustrated in FIG. 10 and described below. Thereupon the closing solenoid S is disabled by clearing the flag.

At step 525, it is determined whether the CAM switch is closed. If not, the program proceeds to step 527. If at step 525 the CAM switch is determined to be closed, it is determined whether the spring switch is closed. If not, the program proceeds to step 527. If it is determined at step 526 that the spring switch is closed, the program loops back to step 513 and cycles through the sequence again.

Figure 14:
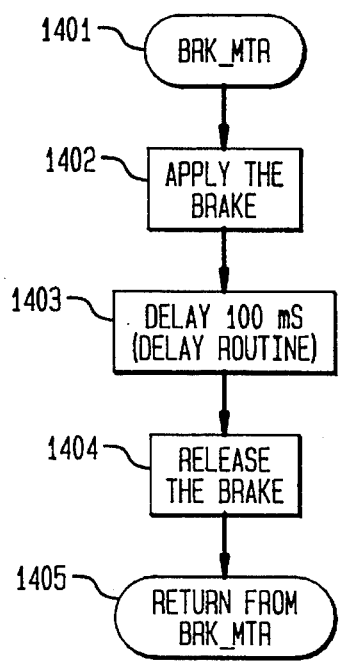

Finally, at step 527, the motor M is turned on. This is done by calling up the run-motor subroutine in FIG. 13 described below. On return from the run-motor subroutine, the brake motor subroutine of FIG. 14 is called up, upon completion of which the program loops back to step 513. Thus the left-hand column of FIG. 5 shows the initialization steps and the rest of FIG. 5 shows the repetitive part of the main program.

Figure 6:
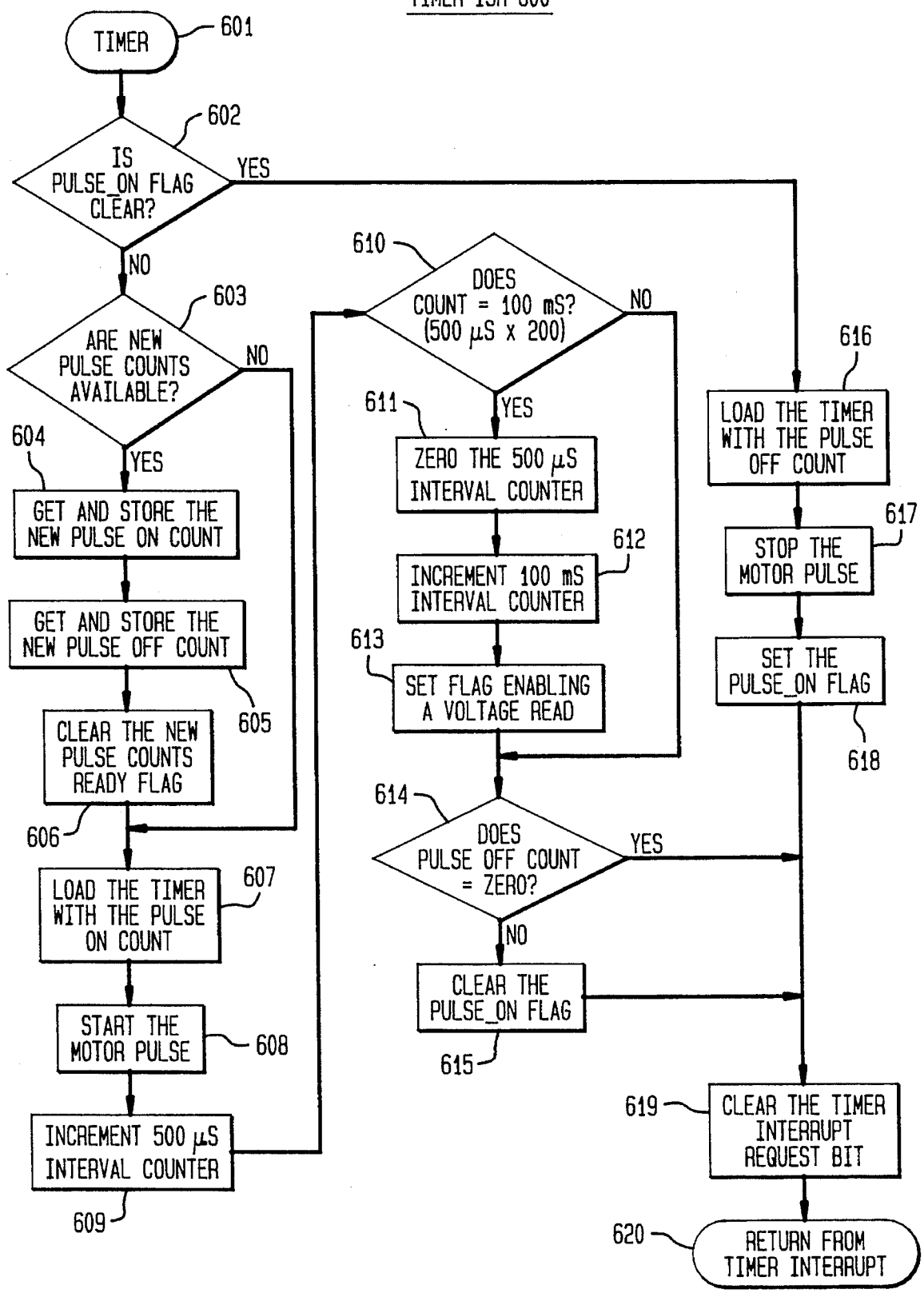

FIG. 6 is a timer interrupt service routine or timer ISR subroutine 600, starting at 601. At step 602, it is determined whether the pulse-on flag is cleared. A cleared flag corresponds to a high signal and indicates that the pulse is to be turned off. If the pulse-on flag is determined to be cleared, the program proceeds immediately to step 616. Otherwise it proceeds to step 603, where it is determined whether new pulse counts are available. This determination relates to the modulation of the PWM signal and is made by looking at the appropriate flag. If new pulse counts are not available, the program proceeds to step 607. If new pulse counts are available, then at step 604 the new pulse-on count is detected and stored, at step 605 the new pulse-off is detected and stored, and at step 606 the new pulse counts ready flag is cleared. (This flag is set in the read-voltage routine of FIG. 11 described below.)

At step 607, the timer is loaded with the pulse-on count. This timer is decremented every four microseconds. A timer-interrupt is generated when the count reaches zero. At step 608, the motor pulse is started and at step 609, the 500 microsecond interval counter is incremented. This is a general purpose counter employed by various routines.

At step 610, it is determined whether the count on the 500 microsecond interval counter equals one hundred milliseconds, which is 200×500 microseconds. If not, the program proceeds immediately to step 614. If the test at step 610 is passed, the program proceeds to step 611, where the 500 microsecond interval counter is set to zero, to step 612, where the 100 millisecond interval counter is incremented, and to step 613, where a flag is set enabling a voltage read.

At step 614, it is determined whether the pulse-off count has reached zero. If so, the program proceeds immediately to step 619. If not, it means that the applied voltage is more than 24 volts, and the pulse-on flag is first cleared at step 615, and then the program proceeds to step 619.

If at step 602 the pulse-on flag is determined to be clear, the program proceeds to step 616, where the timer is loaded with the pulse-off count. At step 617, the motor pulse is stopped, and at step 618, the pulse-on flag is set.

At step 619 the timer-interrupt request bit is cleared and at step 620 the timer-ISR routine 600 returns to the point in the program from which it was called up.

Figure 7:
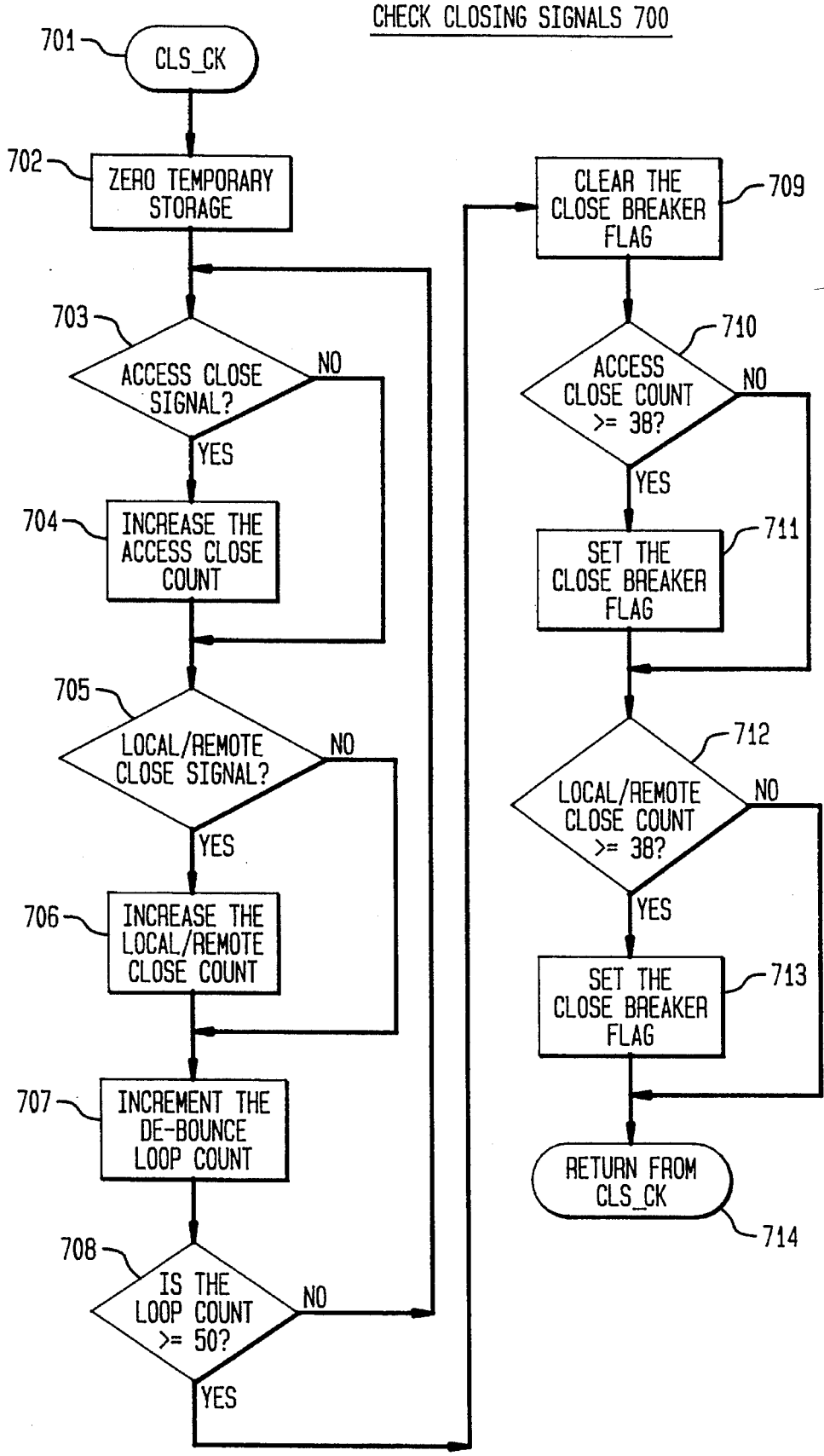

The check-closing signals routine 700 is shown in FIG. 7, beginning at 701. At step 702, temporary storage is set to zero, and at step 703 it is determined whether an access-close signal has been received. If not, the program proceeds immediately to step 705. If the test at step 703 is passed, the access-close count is first increased at step 704.

At step 705, it is determined whether a local/remote close signal is detected. If not, the program steps immediately to step 707. If the local/remote close signal is present, the local/remote close count is first increased at step 706. At step 707, a de-bounce loop count is incremented. The reason for the de-bounce loop count is that when a switch closes, there is not an instantaneous transition from off to on. Rather, there is a great deal of static lasting for a few milliseconds. The de-bounce loop affords enough time for the new state to settle in and be properly detected.

At step 708, it is determined whether the loop count is equal to or greater than 50. If this test is failed, the program loops back to step 703 and repeats. Ultimately the loop count will be determined to be equal to or greater than 50, and the program then proceeds to step 709, where the close breaker flag is cleared. It should already be cleared at this point, but it will have been set if there has been a close signal.

At step 710, it is determined whether the access-close count is equal to or greater than 38. The number 38 is selected because it is about 75% of the count of 50 mentioned in step 708. A count equal to or greater than 38 must be obtained in order to pass this test. If the test at 710 is passed, the close breaker flag is set at step 711, and the program proceeds to step 712. At step 712, it is determined whether the local/remote close count is equal to or greater than 38. The number 38 is selected for the same reason as indicated above. If this test is failed, the program proceeds to step 714 and returns from the subroutine of FIG. 7 to the point in the program where it was called up. If the test at step 712 is passed, the close breaker flag is first set, and then the program returns to step 714 and to the point in the program from which it was called up.

Figure 8:
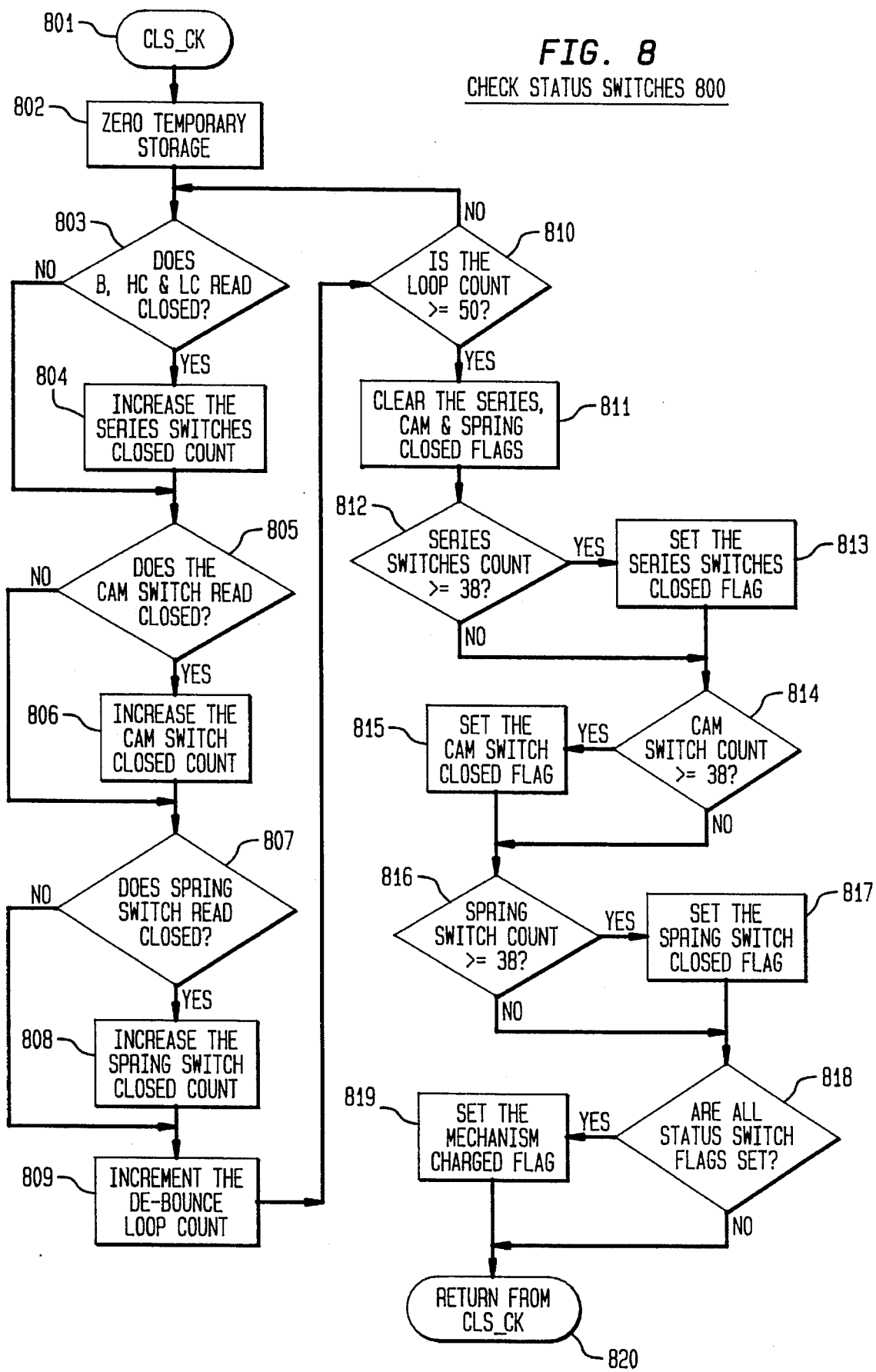

FIG. 8 shows the check status switches, beginning at step 801. At step 802, temporary storage is set to zero. At step 803, it is determined whether the b (breaker open), HC (handle check), and LC (latch check) switches are closed. This signal is supplied to port PA0 (FIG. 3) in series. If this test is failed, the program proceeds immediately to step 805. If the test at step 803 is passed, the series switches closed count is first increased, and the program then proceeds to step 805.

At step 805, it is determined whether the CAM switch (FIG. 3) is closed. If not, the program proceeds to step 807. If at step 805 the CAM switch is determined to be closed, the program first proceeds to step 806, where, the CAM switch closed count is increased.

At step 807, it is determined whether the spring switch is closed. If not, the program proceeds immediately to step 809. If at step 807 the spring switch is determined to be closed, the program first proceeds to step 808, where the spring-switch closed count is increased.

At step 809, the de-bounce loop count is incremented. Steps 810, 811, 812, 813, 814, 815, 816, and 817 are comparable to the de-bounce steps described above, and relate to the series switches (B, HC and LC) count, the CAM switch count, and the spring switch (SC) count.

At step 818, it is determined whether all the status-switch flags are set. If not, at step 820, the program returns to the point from which the subroutine 800 was called up. If the test at step 818 is passed, the mechanism-charged flag is first set at step 819, and then the program proceeds to step 820 and returns to the point in the program from which the subroutine 800 was called up.

Figure 9:
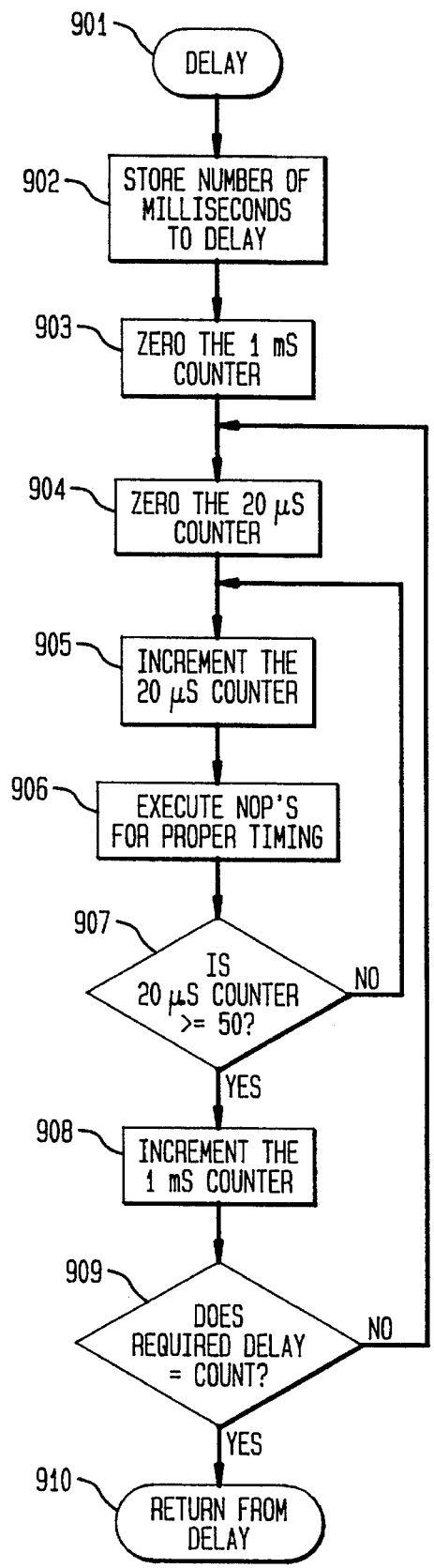

The time-delay subroutine shown in FIG. 9 is employed to insert an appropriate time delay at various points in the program where needed. It begins at step 901 end at step 902 stores the required value of the delay in milliseconds. At step 903, the one millisecond counter is set to zero, and at step 904, the twenty microsecond counter is set to zero. At step 905, the twenty microsecond counter is incremented, at Step 906, a no-instructions step is executed merely to consume time, and at step 907, it is determined whether the 20 microsecond counter is equal to or greater than 50. If not, the program loops back to step 905. When the test at step 907 is finally passed, the one millisecond counter is incremented at step 908.

At step 909, it is determined whether the required delay is equal to the count. If not, the program loops back to step 904. Ultimately, the test at step 909 will be passed, and then at step 910, the program returns to the point from which the time-delay subroutine was called up.

Figure 10:
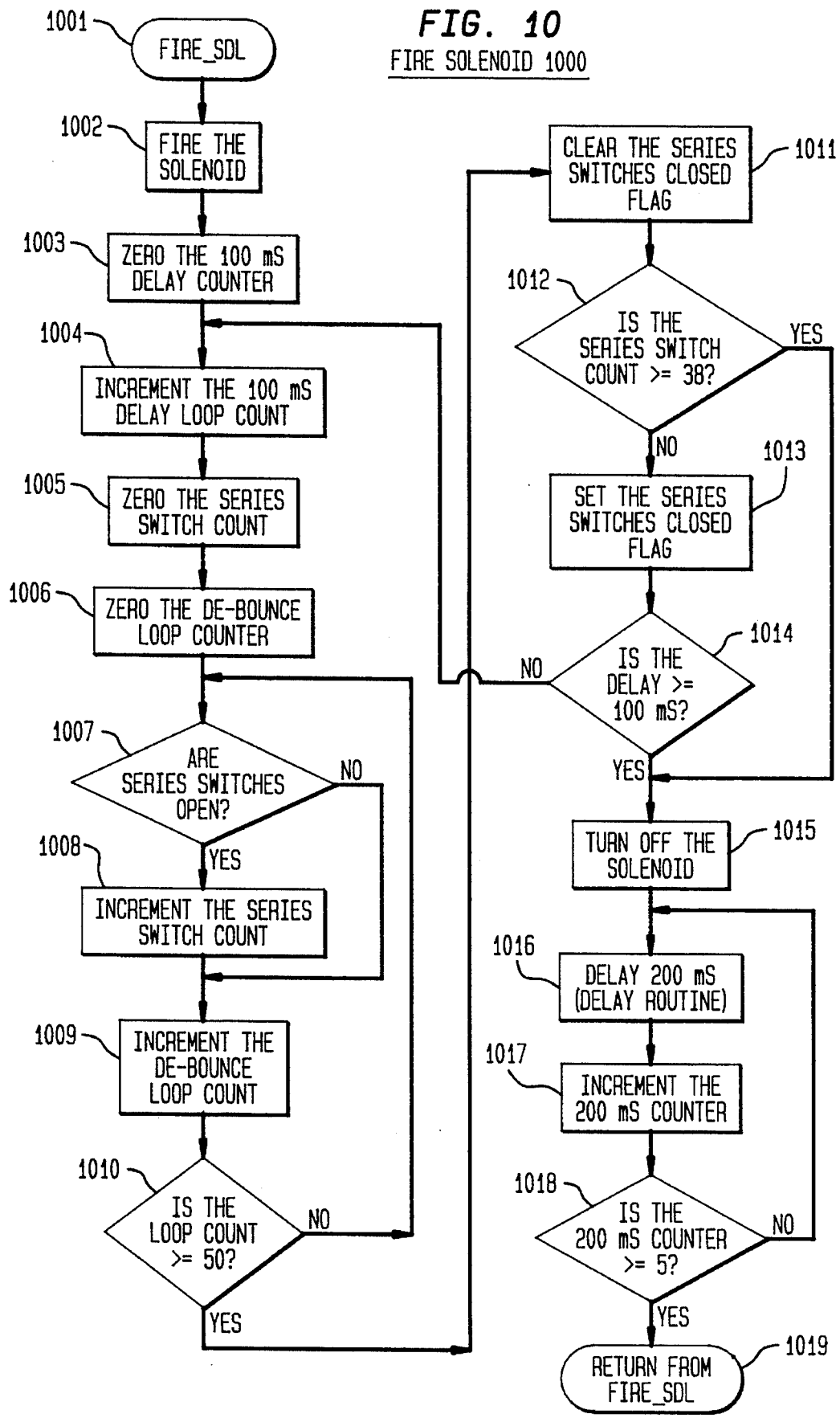

FIG. 10 illustrates the fire-solenoid subroutine beginning at step 1001. At step 1002, the solenoid S is fired. At step 1003, the 100 millisecond delay counter is cleared. At step 1004, the 100 millisecond delay loop count is incremented. At step 1005, the series-switch count is cleared. At step 1006, the de-bounce loop counter is set to zero.

At step 1007, it is determined whether the series switches B, HC and LC are open. If not, the program proceeds directly to step 1009. If the test at step 1007 is passed, the series switch count is incremented at step 1008. At step 1009, the de-bounce loop is incremented, and at step 1010, it is determined whether the loop count is equal to or greater than 50. If not, the program loops back to step 1007 until the loop-count is determined to be equal to or greater than 50, and then proceeds to step 1011.

At step 1011, the series switches closed flag is cleared, and at step 1012, it is determined whether the series switch count is equal to or greater than 38. If so, the program proceeds directly to step 1015. If the test at step 1012 is failed, the series switches closed flag is set, and at step 1014, it is determined whether the delay is equal to or greater than one hundred milliseconds. If the test at step 1014 is failed, the program loops back to step 1004. Ultimately, the test at step 1012 or 1014 will be passed, at which point the solenoid S is turned off via the port PB0 of the microprocessor U3 at step 1015.

At step 1016, a delay of 200 milliseconds is implemented by calling up the delay subroutine of FIG. 9. At step 1017, the 200 millisecond counter is incremented. At step 1018, it is determined whether the count in the 200 millisecond counter is equal to or greater than 5. Since an 8-bit processor is employed, a maximum of 255 (plus zero) can be counted. Therefore the program loops from the step 1018 back to step 1016 until the count is equal to 5, at which time 5×200 milliseconds or one second has elapsed. This affords enough time for the current through the solenoid S to decay. Then the program proceeds to step 1019 and returns to the point from which the subroutine 1000 was called up.

Figure 11:
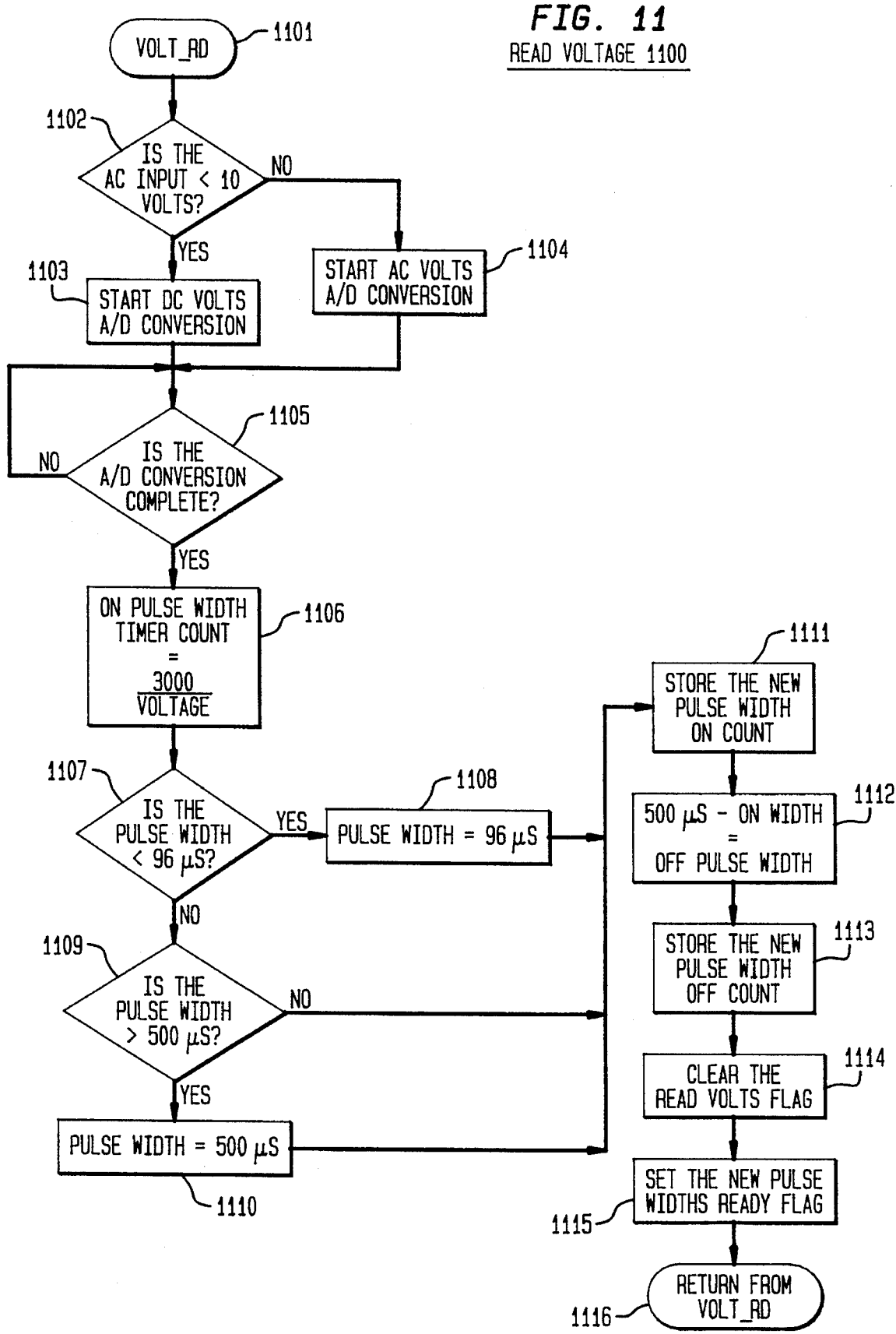

FIG. 11 shows the read voltage subroutine, which begins at step 1101. At step 1102, it is determined whether the AC input supplied to the input port AN1 of the micro-processor U3 is greater than 10 volts. If this test is failed, it means that a DC voltage is supplied to the input port AN0 via terminal W2 and one of terminals W12, W13, W14, and at step 1103, DC-voltage analog to digital conversion is commenced. If the test at step 1102 is passed, it means that AC voltage is supplied to the input port AN1 via the terminals W2 and W1, and the AC voltage analog to digital conversion of the voltage received at the input terminal AN1 of the microprocessor U3 is commenced.

At step 1105, it is determined whether the analog to digital conversion is complete. If not, the program stays at step 1105 until that test is passed. Then the program proceeds to step 1106, where the on-pulse width timer count is set equal to 3,000 divided by the voltage as represented by the analog to digital conversion. The quotient is proportional to the pulse width count. At step 1107, it is determined whether the pulse width is less than 96 microseconds, which corresponds to 125 VDC, the maximum. If the test at step 1107 is passed, the pulse width is set equal to 96 microseconds, and the program proceeds to step 1111. If the test at step 1107 is failed, it is determined whether the pulse width is greater than 500 microseconds. If this test is failed, the test at step 1107 also having been failed, the program proceeds to step 1111. If the test at step 1109 is passed, the program proceeds to step 1110, where the pulse width is set to 500 microseconds, which is a period corresponding to a 24-VDC input and to a duty cycle of 100%.

At step 1111, the new pulse width-on count is stored. As indicated above, this will be a value between 96 and 500 microseconds. At step 1112, the pulse-on width is subtracted from 500 microseconds to produce the complementary pulse-off width. At step 1113, the new pulse width-off count is stored. At step 1114, the read-voltage flag is cleared. This flag is set every hundred milliseconds in the timer ISR subroutine of FIG. 6. At step 1115, the new pulse width-ready flag is set so that the new values will be called up. At step 1116, the program returns to the point from which the subroutine 1100 was called up.

Figure 12:
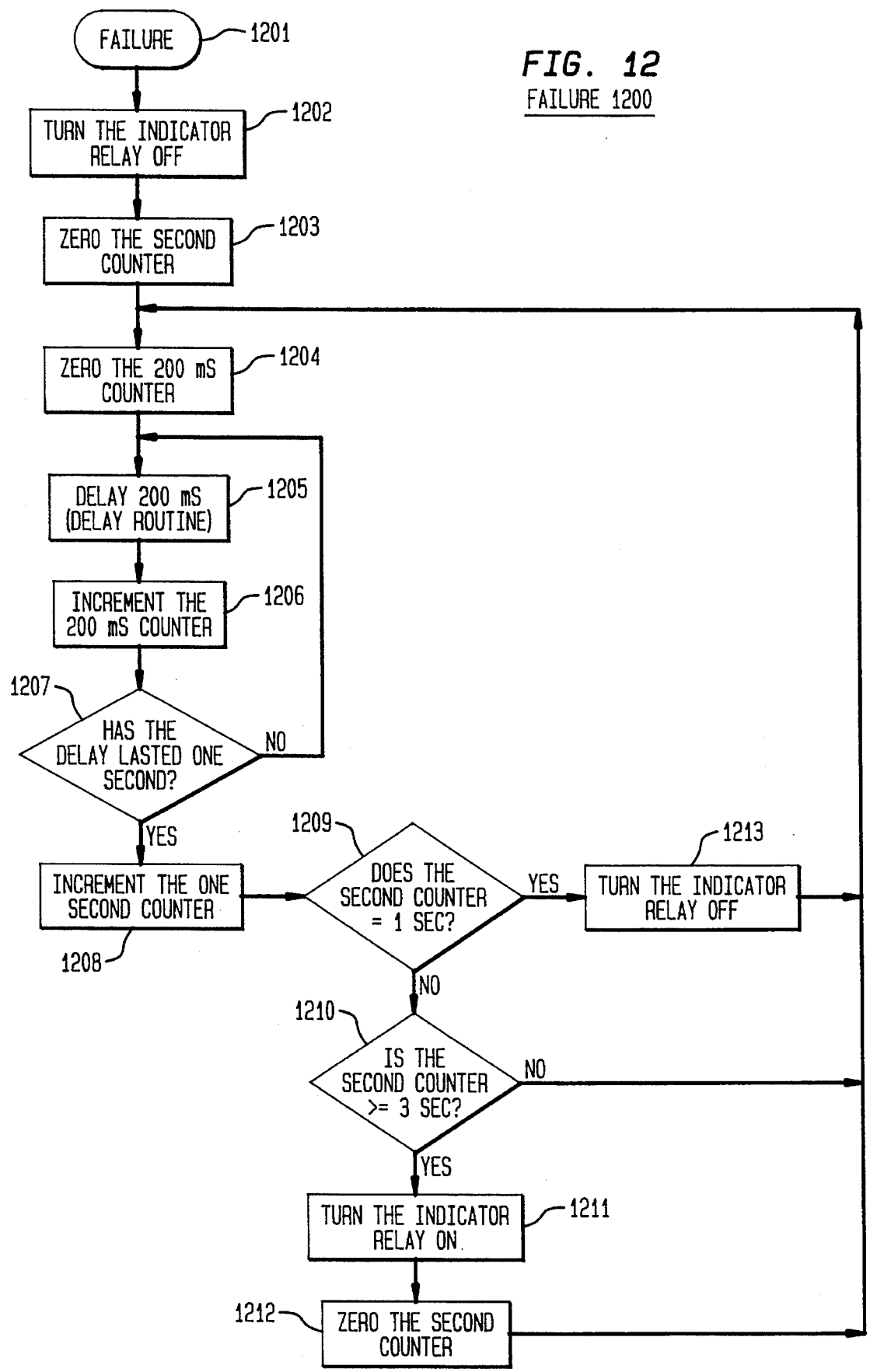

FIG. 12 shows the failure subroutine, beginning at step 1201. At step 1202, the indicator relay K1 is turned off. At step 1203, the one-second counter is set to zero. At step 1204, the 200-millisecond counter is set to zero. At step 1205, a delay of 200 milliseconds is provided by calling up the delay subroutine of FIG. 9. At step 1206, the 200-millisecond counter is incremented. At step 1207, it is determined whether the delay has lasted for one second. If not, the program loops back to step 1205 until the test at step 1207 is passed.

The program then proceeds to step 1208, where the one-second counter is incremented. At step 1209, it is determined whether the count in the one-second counter corresponds to one second. If so, the indicator-relay K1 is turned off at step 1213, and the program loops back to step 1204. If the test at step 1209 is failed, it is determined whether the count in the second counter is equal to or greater than three seconds. If this test is failed, the program loops back to step 1204. If the test at step 1210 is passed, the indicator relay K1 is turned on step 1211, and the one-second counter is zeroed at step 1212. As a result of the failure subroutine, the indicator relay K1 is turned off after one second and turned back on after three seconds. In other words, the relay is on for one second and off for two seconds alternately in case of a failure mode.

Figure 13:
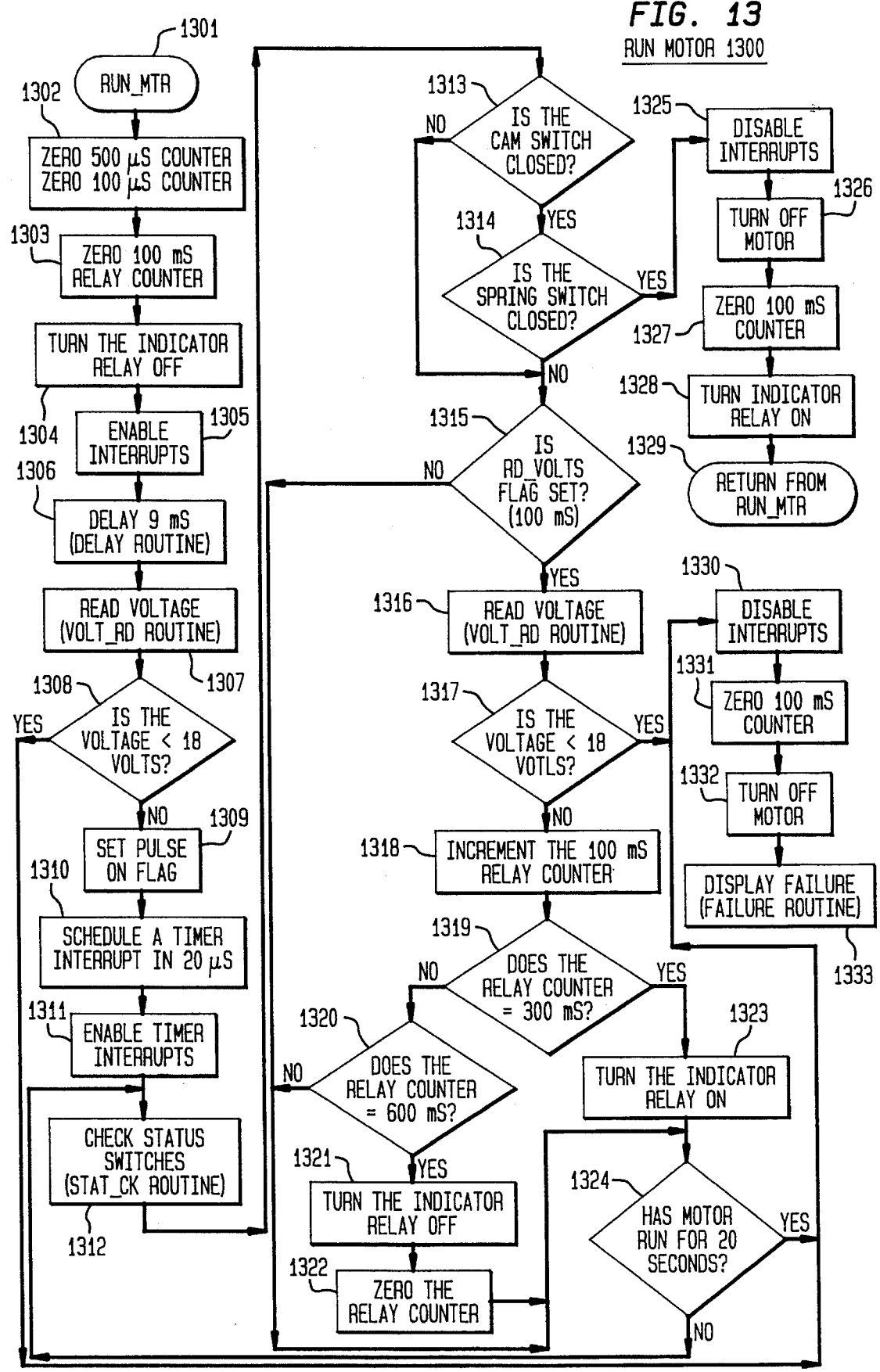

FIG. 13 shows the run-motor subroutine beginning at step 1301. At step 1302, the 500-microsecond counter and 100-millisecond counter, which are incremented in the timer ISR subroutine, are set to zero. At step 1303, the 100 millisecond relay counter is set to zero. At step 1304, the indicator relay K1 is turned off. At step 1305, the interrupts are enabled so that timer interrupts can be effected by the subroutine of FIG. 6. At step 1307, the voltage is read by calling up the read-voltage subroutine of FIG. 11.

At step 1308, it is determined whether the voltage read is less than 18 volts. If so, there has been a failure, since the voltage should nominally be at least 24 volts and should never fall much below that value. The program then proceeds to step 1330. If the test at step 1308 is failed, however, meaning that at least 18 volts is supplied by the external source, the pulse-on flag is set at step 1309. At step 1310, the value 5 is loaded into a 4-microsecond counter in order to schedule a timer interrupt in 20 microseconds (=5×4 microseconds). At step 1311, timer interrupts are enabled. This calls up the timer ISR subroutine of FIG. 6 in the background, while the run motor subroutine of FIG. 13 continues to run in the foreground. Each time the timer interrupt counter reaches zero after being loaded with a value and decremented, the run-motor subroutine is interrupted. This results in an asynchronous shifting between the run-motor subroutine and the timer ISR subroutine.

At step 1312, the status of the switches is checked by calling up the check-status-switches subroutine of FIG. 8.

At step 1313, it is determined whether the cam switch (CAM) is closed. If not, the program proceeds to step 1315. if the test at step 1313 is passed, the program proceeds to step 1314, where a determination is made whether the spring switch (CS) is closed. If this test is passed, both the cam switch and the spring switch have been found to be closed, and the program proceeds to step 1325.

If either the cam switch or the spring switch is not closed, the program proceeds to step 1315, where it is determined whether the read-voltage flag has been set. If not, the program proceeds to step 1324. If the test at step 1315 is passed, the voltage is read by calling up the read-voltage subroutine of FIG. 11.

At step 1317, it is determined whether the voltage read is less than 18 volts. If so, there has been a failure, since the voltage supplied should nominally be at least 24 volts and should never fall much below that value. The program then proceeds to step 1330. If the test at step 1317 is failed, meaning that the supplied voltage is at least 18 volts, the program proceeds to step 1318, where the 100-millisecond relay counter is incremented, so that the supplied voltage is monitored every 100 milliseconds.

At step 1319, it is determined whether the relay counter stores a value corresponding to 200 milliseconds. If so, the program proceeds to step 1323, where the indicator relay K1 is turned on. If the test at step 1319 is failed, the program proceeds to step 1320, where it is determined whether the relay counter stores a value corresponding to 600 milliseconds. If this test is failed, the program proceeds directly to step 1324; otherwise, the indicator relay K1 is turned off at step 1321, the relay counter is set to zero at step 1322, and then the program proceeds to step 1324.

At step 1324, it is determined whether the motor M has been running for 20 seconds. If not, the program loops back to step 1312. However, if the motor is found at step 1324 to have been running for 20 seconds, there has been a failure, and the program proceeds to step 1330.

Thus, the run-motor subroutine of FIG. 13 ends successfully at steps 1325–1329 or in failure at steps 1330–1333.

In case of success (the usual case), the interrupts are disabled at step 1325, so that there will be no more interrupts from the timer ISR subroutine of FIG. 6. At step 1326, the motor M is turned off. At step 1327, the 100 millisecond counter is set to zero. At step 1328, the indicator relay K1 is turned on so that it gives a steady indication. At step 1329, the program returns to the location from which the run-motor subroutine of FIG. 13 was called up.

In case of a failure, the interrupts are disabled at step 1330, the 100-millisecond counter is set to zero at step 1331, the motor M is turned off at step 1332, and the failure subroutine of FIG. 12 is called up.

FIG. 14 shows the brake motor subroutine, beginning at step 1401. At step 1402, the brake is applied via the signal BRAKE (i.e., the output port PB1 of the microprocessor U3 is turned "on"). At step 1403, a delay of 100 milliseconds is effected by calling up the subroutine of FIG. 9. At step 1404, the brake is released (the output port PB1 is turned "off"). At step 1405, the subroutine of FIG. 14 ends and the program returns to the point from which the subroutine was called up.

Thus there is provided in accordance with the invention a novel and highly effective apparatus for use in closing a circuit breaker. The apparatus can be reliably operated by an AC or DC source of power the voltage of which may have any value within a wide range. Moreover, the apparatus includes interlock features that prevent operation of the apparatus unless all conditions necessary to its safe operation are satisfied.

Many modifications of the preferred embodiment of the invention disclosed above will readily occur to those skilled in the art. For example, the nature of the indicator activated by the relay K1, the choice of the microprocessor, the choice of a motor M and of the voltage at which it is designed to operate, and the software used to program the microprocessor all can be varied, as those skilled in the art will readily understand. Accordingly, the invention is to be construed as including all embodiments thereof that fall within the scope of the appended claims.

We claim:

1. Apparatus for use in combination with a circuit breaker that is capable of moving from an open position to a closed position in order respectively to prevent or enable flow of current through a circuit protected by said circuit breaker, said apparatus comprising:

terminal means for connection to a selected source of electric power, the electric power available from said source being separate from said current in said circuit protected by said circuit breaker and having a voltage that varies in accordance with the source selected;

actuating means including an electric motor for charging spring means and a solenoid for releasing said spring means for moving said circuit breaker from said open position to said closed position, said actuating means being connected to and deriving power from said terminal means and normally requiring for its proper operation electric power of a predetermined voltage; and microprocessor control means connected to and deriving power from said terminal means and producing a control signal for controlling said actuating means, said control signal being responsive to said variable voltage to control the duty cycle of the power supplied to said electric motor and solenoid in such a manner as to compensate for a departure of said variable voltage from said predetermined voltage.

2. Apparatus according to claim 1 wherein said variable voltage includes at least one of an AC voltage and a DC voltage.

3. Apparatus according to claim 2 wherein said DC voltage includes voltage levels of 24, 48 and 125 volts.

4. Apparatus according to claim 2 wherein said AC voltage includes a level of 120 volts.

5. Apparatus according to claim 1 wherein said variable voltage includes at least one of an AC voltage and a DC voltage at a level anywhere within the range of 24 to 125 volts.

6. Apparatus according to claim 1 wherein said electric motor has a constant spring charging time.

7. Apparatus according to claim 6 wherein said predetermined voltage is 24 VDC.

8. Apparatus according to claim 1 wherein said predetermined voltage is 24 VDC.

9. Apparatus according to claim 1 wherein said control signal is a pulse width modulated signal.

10. Apparatus according to claim 9 wherein said microprocessor control means is responsive to the variable voltage for establishing the width of said pulse width modulated signal.

11. Apparatus for use in combination with a circuit breaker that is capable of moving from an open position to a closed position, said apparatus comprising:

sensing means for sensing at least one condition that must be satisfied in order for the circuit breaker to be moved safely from said open position to said closed position, actuating means having a duty cycle, including an electric motor and a solenoid for moving said circuit breaker from said open position to said closed position; and microprocessor control means responsive to said sensing means and controlling said actuating means duty cycle by utilizing pulse width modulation, so that said actuating means moves said circuit breaker from said open position to said closed position only when said at least one condition is satisfied;

wherein said at least one condition includes at least one of charging springs for moving the circuit breaker from the open position to the closed position being charged, a cam for charging said springs being in a dwell position, a standby charging handle being in a stored condition, and a tripping latch being engaged.

12. Apparatus for use in combination with a circuit breaker that is capable of moving from an open position to a closed position, said apparatus comprising:

terminal means for connection to a selected source of electric power, the electric power available from said source having a voltage that varies in accordance with the source selected;

actuating means connected to and deriving power from said terminal means and including an electric motor for charging spring means and a solenoid for releasing said spring means to move said circuit breaker from said open position to said closed position, each of said electric motor and said solenoid normally requiring for its proper operation electric power of a predetermined voltage;

sensing means for sensing at least one condition that must be satisfied in order for the breaker to be moved safely from said open position to said closed position; and microprocessor control means connected to and deriving power from said terminal means, responsive to said sensing means, and producing a control signal for controlling said actuating means, said control signal having an adjustable characteristic related to said variable voltage in such a manner that the power supplied to said motor and said solenoid is pulse width modulated to simulate said predetermined voltage, and said microprocessor control means controlling said actuating means in such a manner that said actuating means moves said circuit breaker from said open position to said closed position when and only when said at least one condition is satisfied.

13. Apparatus according to claim 12 wherein said variable voltage includes at least one of an AC voltage and a DC voltage.

14. Apparatus according to claim 13 wherein said DC voltage includes voltage levels of 24, 48 and 125 volts.

15. Apparatus according to claim 13 wherein said AC voltage includes a level of 120 volts.

16. Apparatus for use in combination with a circuit breaker that is capable of moving from an open position to a closed position, said apparatus comprising:

terminal means for connection to a selected source of electric power, the electric power available from said source having a characteristic that varies in accordance with the source selected;

actuating means for moving said circuit breaker from said open position to said closed position, said actuating means being connected to and deriving power from said terminal means and including an electric motor and a solenoid each requiring for its proper operation electric power of a predetermined characteristic;

sensing means for sensing at least one condition that must be satisfied in order for the circuit breaker to be moved safely from said open position to said closed position; and microprocessor control means connected to and deriving power from said terminal means, responsive to said sensing means, and producing a control signal for controlling said actuating means, said control signal having an adjustable characteristic related to said variable characteristic in such a manner that the power supplied to said motor and said solenoid effectively conforms to said predetermined characteristic, and said microprocessor control means controlling said actuating means in such a manner that said actuating means moves said circuit breaker from said open position to said closed position only when said at least one condition is satisfied;

wherein said at least one condition includes at least one of charging springs for moving the circuit breaker from the open position to the closed position being charged, a cam for charging said springs being in a dwell position, a standby charging handle being in a stored condition, and a tripping latch being engaged.

* * * * *